(12) United States Patent
Agetsuma et al.

(10) Patent No.: US 8,499,062 B2
(45) Date of Patent: Jul. 30, 2013

(54) STORAGE SYSTEM HAVING A VIRTUAL CONNECTION BETWEEN A VIRTUAL NETWORK ATTACHED PROCESS AND A MANAGEMENT PROCESS, AND AN INFORMATION PROCESSING APPARATUS AND CONNECTION METHOD THEREOF

(75) Inventors: Masakuni Agetsuma, Yokohama (JP); Takahiro Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 927 days.

(21) Appl. No.: 11/968,230

(22) Filed: Jan. 2, 2008

(65) Prior Publication Data
US 2008/0209025 A1    Aug. 28, 2008

(30) Foreign Application Priority Data
Feb. 23, 2007    (JP) ................. 2007-044415

(51) Int. Cl.
*G06F 15/16*    (2006.01)

(52) U.S. Cl.
USPC ........... 709/223; 709/208; 709/209; 709/210; 709/211; 709/230

(58) Field of Classification Search
USPC .......................................................... 709/223
See application file for complete search history.

(56) References Cited

U.S. PATENT DOCUMENTS

| | | | |
|---|---|---|---|
| 7,587,506 B2 * | 9/2009 | Nakano et al. | 709/230 |
| 2004/0123068 A1 * | 6/2004 | Hashimoto | 711/206 |
| 2004/0143608 A1 | 7/2004 | Nakano et al. | |
| 2005/0149667 A1 * | 7/2005 | Nakayama et al. | 711/114 |
| 2006/0225073 A1 | 10/2006 | Akagawa et al. | |

FOREIGN PATENT DOCUMENTS

| | | |
|---|---|---|
| JP | 2004-227127 | 8/2004 |
| JP | 2006-285875 | 10/2006 |

* cited by examiner

*Primary Examiner* — Ruolei Zong
*Assistant Examiner* — David X Yi
(74) *Attorney, Agent, or Firm* — Brundidge & Stanger, P.C.

(57) ABSTRACT

The storage system in the present invention includes: plural control units for controlling data sending/reception independently for each network; a management unit provided between a management computer and the control units, for managing the control units based on a command sent from the management computer; a virtual communication channel creation unit for creating a virtual communication channel between the management unit and the control units; a virtual communication channel connection unit for separately connecting the management unit and each control unit to the virtual communication channel created by the virtual communication channel creation unit; and a sending unit for sending, to each control unit, a command sent from the management computer via the virtual communication channel connected by the virtual communication channel connection unit.

15 Claims, 26 Drawing Sheets

FIG.5

| PROCESS ID | USER ID | VANS ID | FILE DESCRIPTOR | | | |
|---|---|---|---|---|---|---|
| | | | 0 | 1 | ... | 1023 |
| 1 | 0 | MANAGEMENT VNAS | | | | |
| 2 | 1000 | MANAGEMENT VNAS | | | | |
| 3 | 1000 | VNAS1 | | | | |
| 4 | 2000 | VNAS2 | | | | |
| ⋮ | ⋮ | ⋮ | ⋮ | ⋮ | ⋮ | ⋮ |

| PROCESS ID | USER ID | VNAS ID | FILE DESCRIPTOR | | | |
|---|---|---|---|---|---|---|
| | | | 0 | 1 | 2 | ... |
| ⋮ | ⋮ | ⋮ | ⋮ | ⋮ | ⋮ | |
| 2 | 1000 | MANAGEMENT VNAS | | | | |
| 3 | 1000 | VNAS1 | 0xc4000040 | | | |
| ⋮ | ⋮ | ⋮ | ⋮ | ⋮ | ⋮ | ⋮ |

| PROCESS ID | USER ID | VNAS ID | FILE DESCRIPTOR | | | |
|---|---|---|---|---|---|---|
| | | | 0 | 1 | 2 | ... |
| ⋮ | ⋮ | ⋮ | ⋮ | ⋮ | ⋮ | |
| 2 | 1000 | MANAGEMENT VNAS | 0xc4000040 | | | |
| 3 | 1000 | VNAS1 | 0xc4000040 | | | |
| ⋮ | ⋮ | ⋮ | ⋮ | ⋮ | ⋮ | ⋮ |

28A  28B  28C  28D

| | | |
|---|---|---|
| 0xc4000100 | sock | —81A |
| | NONE | —81B |
| | | —81C |
| | | —81D |
| | 0xc500600 | —81E |
| | NONE | —81F |
| | NONE | —81G |

| PROCESS ID | USER ID | VNAS ID | FILE DESCRIPTOR | | | |
|---|---|---|---|---|---|---|
| | | | 0 | 1 | 2 | ... |
| ⋮ | ⋮ | ⋮ | ⋮ | ⋮ | ⋮ | |
| 2 | 1000 | MANAGEMENT VNAS | 0xc4000040 | 0xc4000100 | | |
| 3 | 1000 | VNAS1 | 0xc4000040 | | | |
| ⋮ | ⋮ | ⋮ | ⋮ | ⋮ | ⋮ | ⋮ |

28A  28B  28C  28D

STORAGE SYSTEM HAVING A VIRTUAL CONNECTION BETWEEN A VIRTUAL NETWORK ATTACHED PROCESS AND A MANAGEMENT PROCESS, AND AN INFORMATION PROCESSING APPARATUS AND CONNECTION METHOD THEREOF

CROSS-REFERENCES TO RELATED APPLICATIONS

This application relates to and claims priority from Japanese Patent Application No. 2007-044415, filed on Feb. 23, 2007, the entire disclosure of which is incorporated herein by reference.

BACKGROUND

The invention relates to a storage system, an information processing apparatus, and a connection method. For example, the invention is suitable for use in an information processing apparatus that is connected to, and that exchanges data between, a client apparatus and a storage apparatus.

Conventionally, NAS (Network Attached Storage) apparatuses have been widespread. A NAS apparatus enables plural information processing devices (client systems) in a network to share a file stored in a storage apparatus connected via a storage interface such as SCSI or Fibre Channel. Each client apparatus accesses the shared file by using an NFS (Network File System) or CIFS (Common Internet File System) service provided by the NAS apparatus.

Recently, a technique for executing an operating system (OS) that performs plural NAS functions (hereinafter referred to as a "NAS control system") in an information processing apparatus by means of a multiple instance feature in the operating system and making file systems or the network environment in each NAS control system independent has also been put into practical use.

Using those techniques, in the information processing apparatus, spying, from a NAS control system, on file systems used in another NAS control system, or access to a client system to which another NAS control system is currently providing services can be prevented. Using those techniques, in the information processing apparatus, spying, from a NAS control system, on file systems in another NAS control system, or access from a client apparatus using a NAS control system to another NAS control system via a network can be prevented.

Since high security in NAS control systems can be maintained in the information processing apparatus as described above, each NAS control system in one information processing apparatus can separately provide the NAS service to a company.

If a number of NAS control systems are managed, as is the case in a data center, a technique for an administrator to collectively manage those systems becomes necessary. There currently is a method of collectively managing plural NAS control systems by connecting a management device and NAS control systems with a LAN or similar, and sending an order from the management device to the NAS control systems (for example, see JP-A-2004-227127).

However, if plural NAS control systems share a network a physical cable such as a LAN, not only communication between the management device and each NAS control system, but also communication between the NAS control systems is enabled.

Therefore, if, for example, one of those NAS control system is hacked via an existing security hole, the other NAS control systems connected to the hacked one via a network such as a LAN are also exposed to the risk of information leakage, hacking, or virus infection, etc.

The present invention has been made in light of that problem, and its object is to provide a highly reliable storage system, information processing apparatus, and connection method.

SUMMARY

To achieve the above-stated object, a storage system includes: a host computer connected to plural independent networks, each of the networks being connected to a client apparatus relevant to the network, and the host computer being connected to each client apparatus via the relevant network, the host computer receiving data sent from the client apparatus and sending the data to a storage apparatus; and a management computer that manages the host computer, wherein the host computer includes: plural control units for controlling data sending/reception independently for each network; a management unit provided between the management computer and the control units, for managing the control units according to a command sent from the management computer; a virtual communication channel creation unit for creating a virtual communication channel between the management unit and each control unit; a virtual communication channel connection unit for separately connecting the management unit and each control unit to the virtual communication channel created by the virtual communication channel creation unit; and a sending unit for sending, to each control unit, a command sent from the management computer via the virtual communication channel connected by the virtual communication channel connection unit.

Also, according to an embodiment of the invention, an information processing apparatus connected to plural independent networks, each of the networks being connected to a client apparatus relevant to the network, and the information processing apparatus being connected to each client apparatus via the relevant network, the information processing apparatus executing various kinds of processing based on data sent from the client apparatus, includes: plural control units for controlling data sending/reception independently for each network; a management unit provided between the control units and an external device that manages the control units, for managing the control units according to a command sent from the external device; a virtual communication channel creation unit for creating a virtual communication channel between the management unit and each control unit; and a virtual communication channel connection unit for separately connecting the management unit and each control unit to the virtual communication channel created by the virtual communication channel creation unit.

Also, according to an embodiment of the invention, a connection method for an information processing apparatus connected to plural independent networks, each of the networks being connected to a client apparatus relevant to the network, and the information processing apparatus being connected to each client apparatus via the relevant network, the information processing apparatus executing various kinds of processing based on data sent from the client apparatus, includes: a first step of creating a virtual communication channel between each of plural control units that control data sending/reception independently for each network and a management unit provided between the control units and an external device that manages the control units, the management unit managing the control units based on a command sent from the external device: and a second step of separately connecting the management unit and each control unit to the virtual communication channel created in the first step.

With the above configuration, it becomes possible to effectively prevent communication between control units and collectively manage plural control units.

According to the invention, a highly reliable storage system, information processing apparatus, and connection method can be obtained.

BRIEF DESCRIPTION OF THE DRAWINGS

FIG. 5 is a conceptual diagram illustrating a process management table.

FIG. 17 is a diagram showing a process management table used in the explanation of virtual communication channel creation processing.

FIG. 19 is a diagram showing a process management table used in the explanation of virtual communication channel connection processing.

DETAILED DESCRIPTION OF PREFERRED EMBODIMENTS

An embodiment of the invention will be described below with reference to the drawings.

Figure 1:
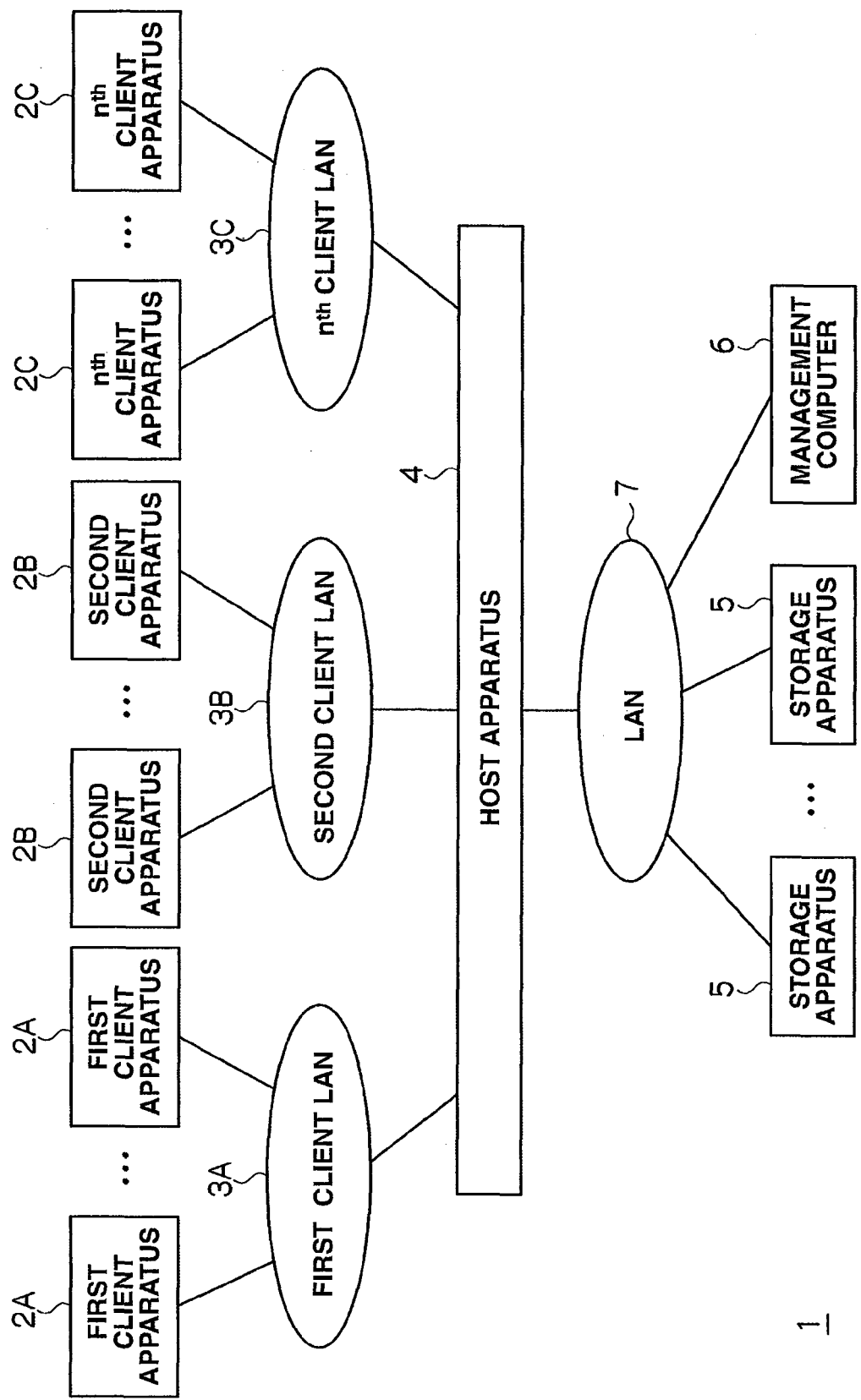
FIG. 1 is a block diagram showing a schematic configuration for a storage system according to an embodiment of the invention.

FIG. 1 shows a configuration for a storage system 1 in this embodiment of the invention. In an example of the storage system 1, a first client apparatus 2A is connected to a host computer 4 via a first client LAN (Local Area Network) 3A, a second client apparatus 2B is connected to the host computer 4 via a second client LAN 3B, an $n^{th}$ client apparatus 2C is connected to the host computer 4 via an $n^{th}$ client LAN 3C, and a storage apparatus 5 and management computer 6 are connected to the host computer 4 via a LAN 7. The first, second, and $n^{th}$ client apparatuses 2A, 2B, and 2C, and the storage apparatus 5 may be either single or plural. The storage apparatus 5 and the management computer 6 may be connected to the same network, or may be connected respectively to networks of different type.

The first, second, and $n^{th}$ client apparatuses 2A, 2B, and 2C are computer devices each having information processing resources such as a CPU (Central Processing Unit) and memory, and examples include a personal computer. Each of the first, second, and $n^{th}$ client apparatuses 2A, 2B, and 2C has information input devices (not shown) such as a keyboard, switch, pointing device, and microphone, etc., and information output devices (not shown) such as a monitor display and speaker, etc. The first, second, and $n^{th}$ client apparatuses 2A, 2B, and 2C send, to the host computer 4, a write request for writing data in a file or similar handled by themselves, or a read request for reading, via the host computer 4, data in a file or similar stored in the storage apparatus 5.

Figure 2:
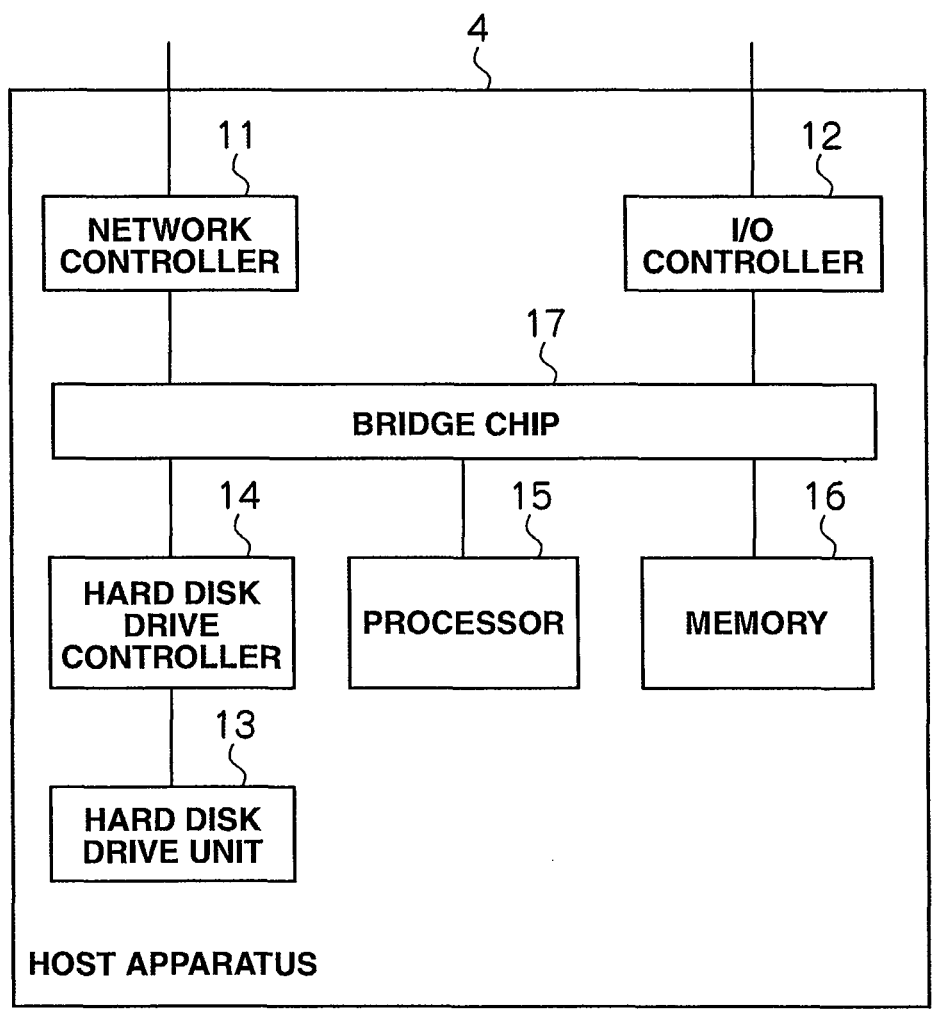
FIG. 2 is a block diagram showing a schematic configuration for a host computer.

FIG. 2 shows an example of a configuration for the host computer 4. The host computer 4 is designed to execute various kinds of processing based on requests from the first, second, and $n^{th}$ client apparatuses 2A, 2B, and 2C. The host computer 4 is connected to the first, second, and $n^{th}$ client LANs 3A, 3B, and 3C, and the LAN 7, and has a network controller 11 for controlling, for example, TCP/IP (Transmission Control Protocol/Internet Protocol) communication, an I/O controller 12 for controlling information input devices (not shown) such as a keyboard, switch, pointing device, and microphone, etc., and information output devices (not shown) such as a monitor display and speaker, etc., and a hard disk drive unit 13 including hard disk drives (not shown). A hard disk drive controller 14 for controlling the hard disk drive unit 13, a processor 15 for controlling the overall host computer 4, and memory 16 that stores various tables and programs are connected to each of the above components via a bridge chip 17 that controls transfer of data such as files. The hardware configuration of the host computer 4 can also be achieved by a versatile personal computer, workstation, or mainframe computer having any other of various configurations.

Figure 3:
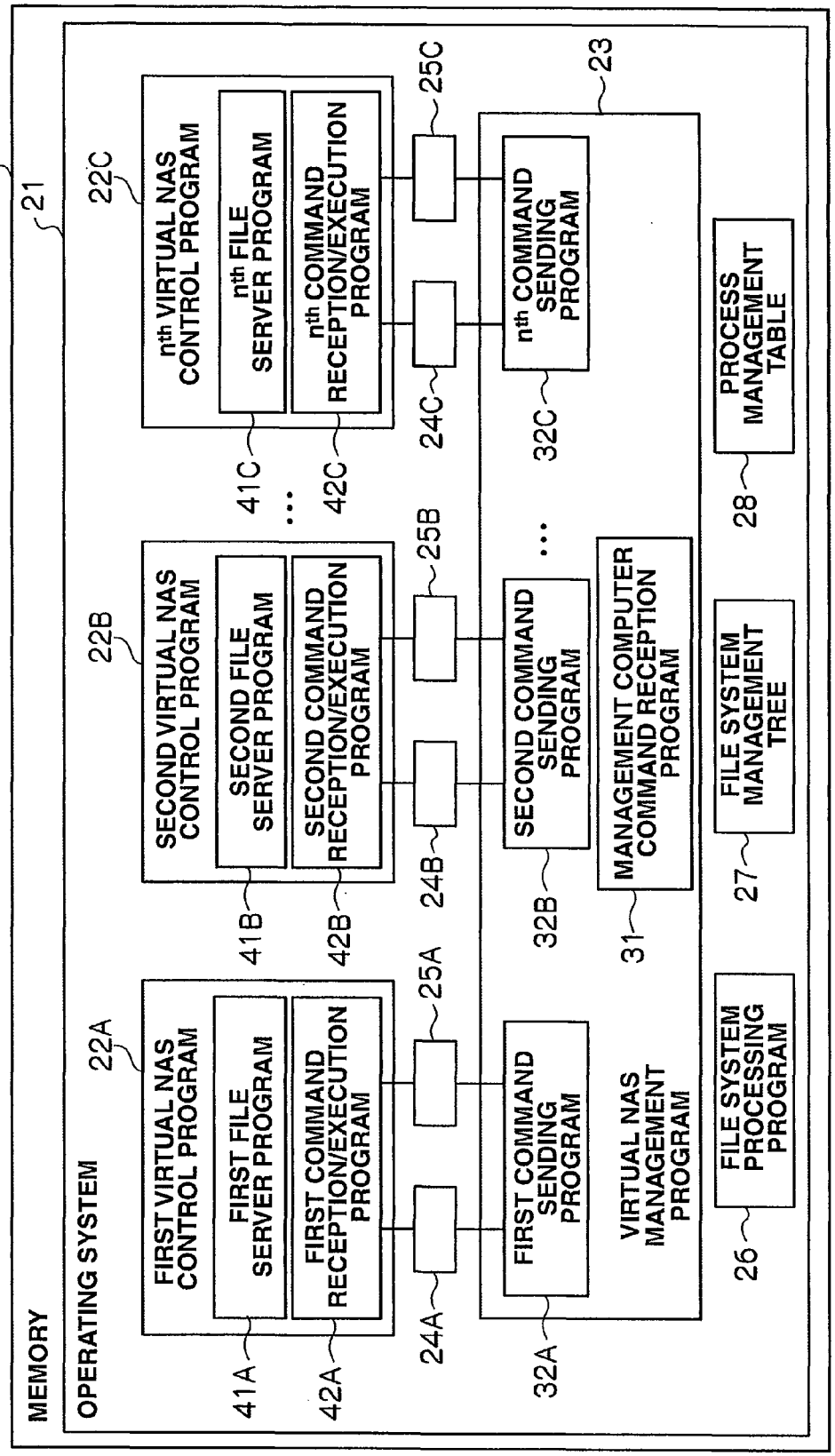
FIG. 3 is a block diagram showing a schematic configuration for memory in a host computer.

FIG. 3 shows an example of various tables and programs stored in the memory 16 in the host computer 4. An operating system 21, as a program for controlling the host computer 4, is stored in the memory 16 in the host computer 4. The operating system 21 has first, second, and $n^{th}$ virtual NAS control programs 22A, 22B, and 22C each functioning as a NAS file server in the operating system 21 by means of a multiple instance feature of the operating system, and a virtual NAS management program 23 that functions as a management server for receiving various commands sent from the management computer 6 and managing the first, second, and $n^{th}$ virtual NAS control programs 22A, 22B, and 22C. The first, second, and $n^{th}$ virtual NAS control programs 22A, 22B, and 22C may be not only the programs that function as NAS file servers, but also other control programs that function as servers that execute various kinds of processing.

In the file system in the memory 16 in the operating system 21, the first, second, and $n^{th}$ virtual NAS control programs 22A, 22B, and 22C are connected one on one to the management program 23. The operating system 21 includes first, second, and $n^{th}$ virtual communication channels 24A, 24B, and 25C as communication channels for sending/receiving various commands, or similar (including the results of command execution, and various notifications), and first, second, and $n^{th}$ emergency virtual communication channels 25A, 25B, and 25C for sending/receiving error messages.

The first, second, and $n^{th}$ virtual communication channels 24A, 24B, and 24C are communication channels for sending/receiving various commands sent from the management computer 6 via the LAN 7, the results of executing those commands, and various notifications. The first, second, and $n^{th}$ emergency virtual communication channels 25A, 25B, and 25C are communication channels for sending/receiving notifications indicating error occurrence, etc.

The operating system 21 also has a file system processing program 26 for executing various kinds of processing relating to the virtual communication channels 24A, 24B, and 24C and the emergency virtual communication channels 25A, 25B, and 25C in the file system for the operating system 21 in the memory 16; a file system management tree 27 for managing the file system; and a process management table 28 for managing processes executing programs.

In the host computer 4, the first virtual NAS control program 22A is connected to the first client apparatus 2A via the first client LAN 3A, the second virtual NAS control program 22B is connected to the second client apparatus 2B via the second client LAN 3B, and the $n^{th}$ virtual NAS control program 22C is connected to the $n^{th}$ client apparatus 2C via the $n^{th}$ LAN 3C. The virtual NAS management program 23 is connected to the management computer 6 via the LAN 7.

As described above, in the host computer 4, the file system and network environment for each of the combinations of the first client apparatus 2A and the first virtual NAS control program 22A, the second client apparatus 2B and the second virtual NAS control program 22B, and the $n^{th}$ client apparatus 2C and the $n^{th}$ virtual NAS control program 22C, are independent.

The virtual NAS management program 23 includes a management computer command reception program 31 for receiving various commands sent from the management computer 6 via the LAN 7 and sending the command execution feedback to the management computer 6, and first, second, and $n^{th}$ command sending programs 32A, 32B, and 32C for sending the commands to the relevant first, second, or $n^{th}$ virtual NAS control program 22A, 22B, or 22C and receiving the command execution feedback.

The first virtual NAS control program 22A includes a first file server program 41A for sending data such as files to the storage apparatus 5 or a request to read data to the storage apparatus 5 based on write/read requests sent from the first client apparatus 2A via the first client LAN 3A, and a first command reception/execution program 4A for receiving various commands sent from the first command sending program 32A, executing the commands, and sending the command execution feedback.

The second and $n^{th}$ virtual NAS control programs 22B and 22C respectively include second and $n^{th}$ file server programs 41B and 41C and second and $n^{th}$ command reception/execution programs 42B and 42C, which perform the same functions as the above explained programs the first virtual NAS control program 22A has.

In the host computer 4, the first command sending program 32A in the virtual NAS management program 23 is connected to the first command reception/execution program 42A in the first virtual NAS control program 22A via the first virtual communication channel 24A and the first emergency virtual communication channel 25A. The second command sending program 32B in the virtual NAS management program 23 is connected to the second command reception/execution program 42B in the second virtual NAS control program 22B via the second virtual communication channel 24B and the second emergency virtual communication channel 25B. The $n^{th}$ command sending program 32C in the virtual NAS management program 23 is connected to the $n^{th}$ command reception/execution program 42C in the $n^{th}$ virtual NAS control program 22C via the $n^{th}$ virtual communication channel 24C and the $n^{th}$ emergency virtual communication channel 25C.

Figure 4:
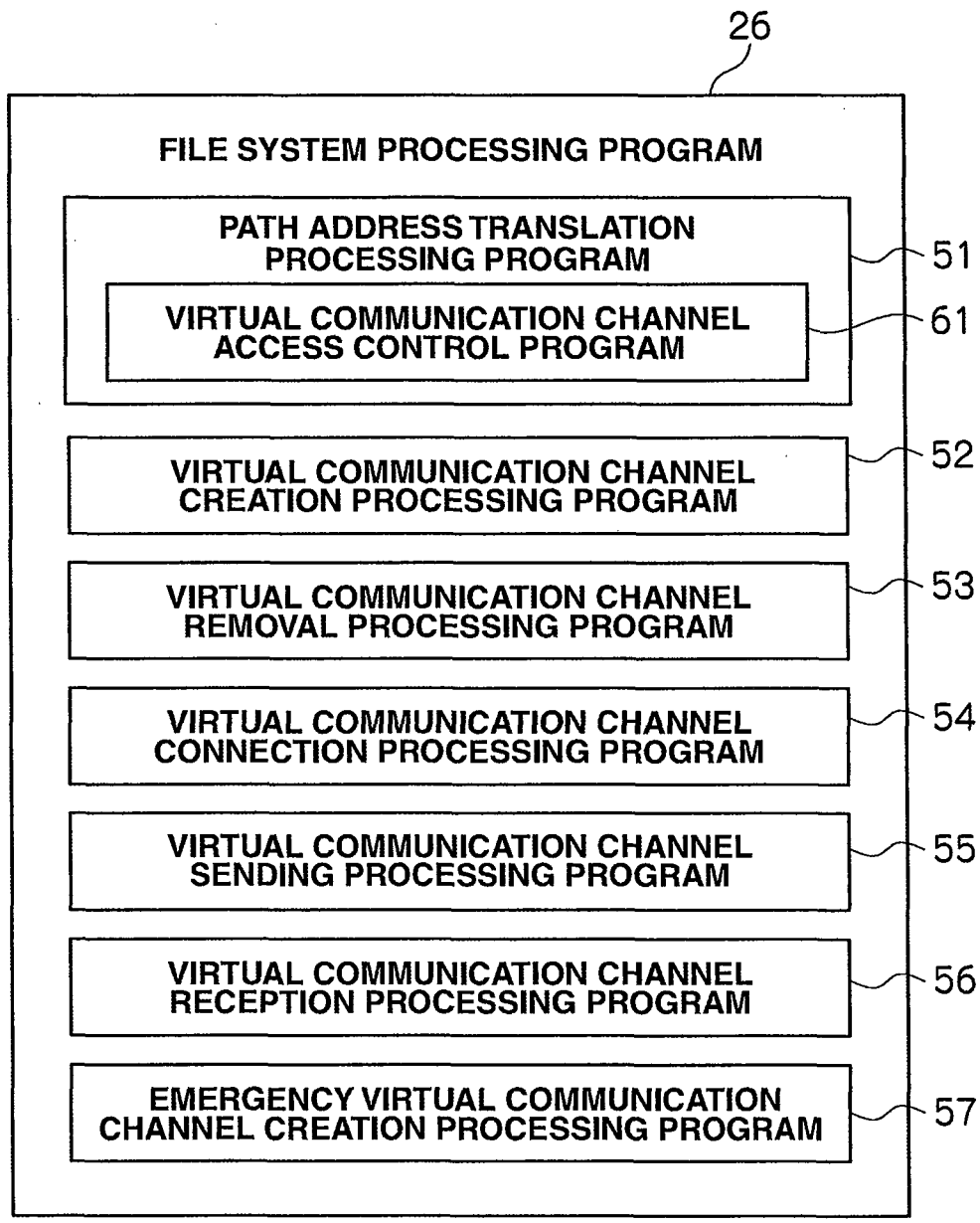
FIG. 4 is a block diagram showing a schematic configuration for a file system processing program.

FIG. 4 shows an example of various programs included in the file system processing program 26. The file system processing program 26 includes: a virtual communication channel access control program 61 for executing access control for the first, second, and $n^{th}$ virtual communication channels 24A, 24B, and 24C and emergency virtual communication channels 25A, 25B, and 25C; a path address translation processing program 51 for translating paths for the file system sent from the first, second, and $n^{th}$ virtual NAS control programs 22A, 22B, and 22C into addresses; a virtual communication channel creation processing program 52 for creating the first, second, and $n^{th}$ virtual communication channels 24A, 24B, and 24C; a virtual communication channel removal processing program 53 for removing the first, second, and $n^{th}$ virtual communication channels 24A, 24B, and 24C and the first, second, and $n^{th}$ emergency virtual communication channels 25A, 25B, and 25C; a virtual communication channel connection processing program 54 for connecting the first, second, and $n^{th}$ virtual communication channels 24A, 24B, and 24C; a virtual communication channel sending processing program 55 for sending various commands to the first, second, and $n^{th}$ virtual communication channels 24A, 24B, and 24C; a virtual communication channel reception processing program 56 for receiving commands from the first, second, and $n^{th}$ virtual communication channels 24A, 24B, and 24C; and an emergency virtual communication channel creation processing program 57 for creating the first, second, and $n^{th}$ emergency virtual communication channels 25A, 25B, and 25C. The path address translation processing program 51 performs ACL (Address Control List) control, i.e., controls access for each user.

FIG. 5 shows an example of a configuration for the process management table 28. The process management table 28 includes: process ID entries 28A for managing process IDs, i.e., identifiers for specifically identifying processes that are the above explained programs currently being executed by the processor 15 in the host computer 4; user ID entries 28B for managing user IDs, i.e., identifiers for specifically identifying users who execute the programs; VNAS ID entries 28C for managing VNAS IDs, i.e., identifiers for specifically identifying the virtual NAS control programs currently being executed; and file descriptor entries 28D for managing file descriptors, i.e., identifiers for specifically identifying addresses used by the file system management program 26.

In this embodiment, "management VNAS" indicates the virtual management program 23, "VNAS1" indicates the first virtual NAS control program 22A, and "VNAS2" indicates the second virtual NAS control program 22B.

Figure 6:
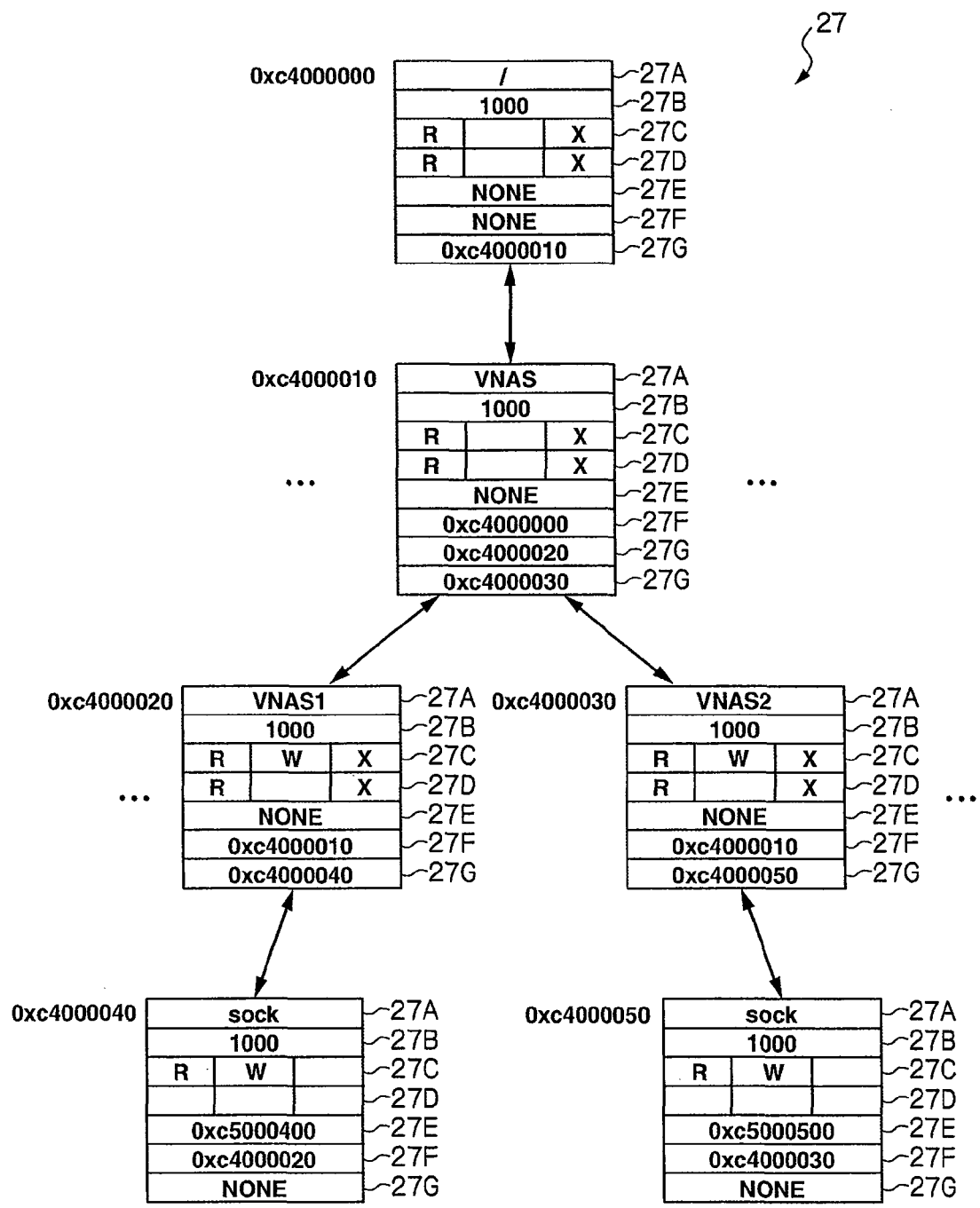
FIG. 6 is a conceptual diagram illustrating a file management tree.

FIG. 6 shows an example of the file management tree 27. The file management tree 27 is a data structure for hierarchically managing plural file management structures (hereinafter referred to simply as "files"), or directory management structures (hereinafter referred to simply as "directories").

Each file or directory managed by the file management tree 27 has a file/directory name entry 27A for managing the file/directory name; a user ID entry 27B for managing a user ID of a prescribed user; user access permission entries 27C for managing types of access permission the user with the user ID stored in the user ID entry 27 has; other user access permission entries 27D for managing types of access permission users other than the user with the user ID stored in the user ID entry 27 have; a virtual communication channel address entry 27E for managing addresses of the first, second, and $n^{th}$ virtual communication channels in the memory 16; a higher-level address entry 27F for managing an address in the memory 16 at which a file/directory one level higher than the relevant file/directory is stored; and a lower-level address entry 27G for managing an address in the memory 16 at which a file/directory one level lower than the relevant file/directory is stored.

"VNAS1" stored as the file/directory name entry 27A is the name corresponding to the first virtual NAS control program 22A, and "VNAS2" stored in the file directory name entry 27A is the name corresponding to the second virtual NAS control program 22B.

"R" stored as the user access permission entries 27C and the other user access permission entries 27D indicates "read permission," "W" indicates "write permission," and "X" indicates "execute permission." A user with "R," "W," or "X" has the corresponding permission, and one without does not.

The "execute permission" means the permission to execute programs for the relevant file if the entry is for the files, or the permission to refer to the directory if the entry is for the directory.

There may be several lower-level address entries 27G. In FIG. 6, for ease of explanation, the address in the memory 16 at which the relevant file or directory is stored is shown in the upper left space of the file/directory.

In the file management tree 27 in FIG. 6, the name of the highest directory is "/(root)" (hereinafter referred to simply as the "/(root)" directory), the name of the next highest directory under the "/(root)" directory is "VNAS" (hereinafter referred to simply as the "VNAS" directory), the names of the lower-level directories under the "VNAS" directory are "VNAS1" and "VNAS2" (hereinafter referred to simply as the "VNAS1" and "VNAS2" directories), and files with the name of "sock" (hereinafter referred to simply as the "sock" files) are located respectively under the "VNAS1" and "VNAS2" directories.

In this embodiment, the "sock" file located under the "VNAS1" directory is a file necessary for connection with the first virtual NAS control program 22A, and the one located under the "VNAS2" directory indicates a file necessary for connection with the second virtual NAS control program 22A.

Figure 7:
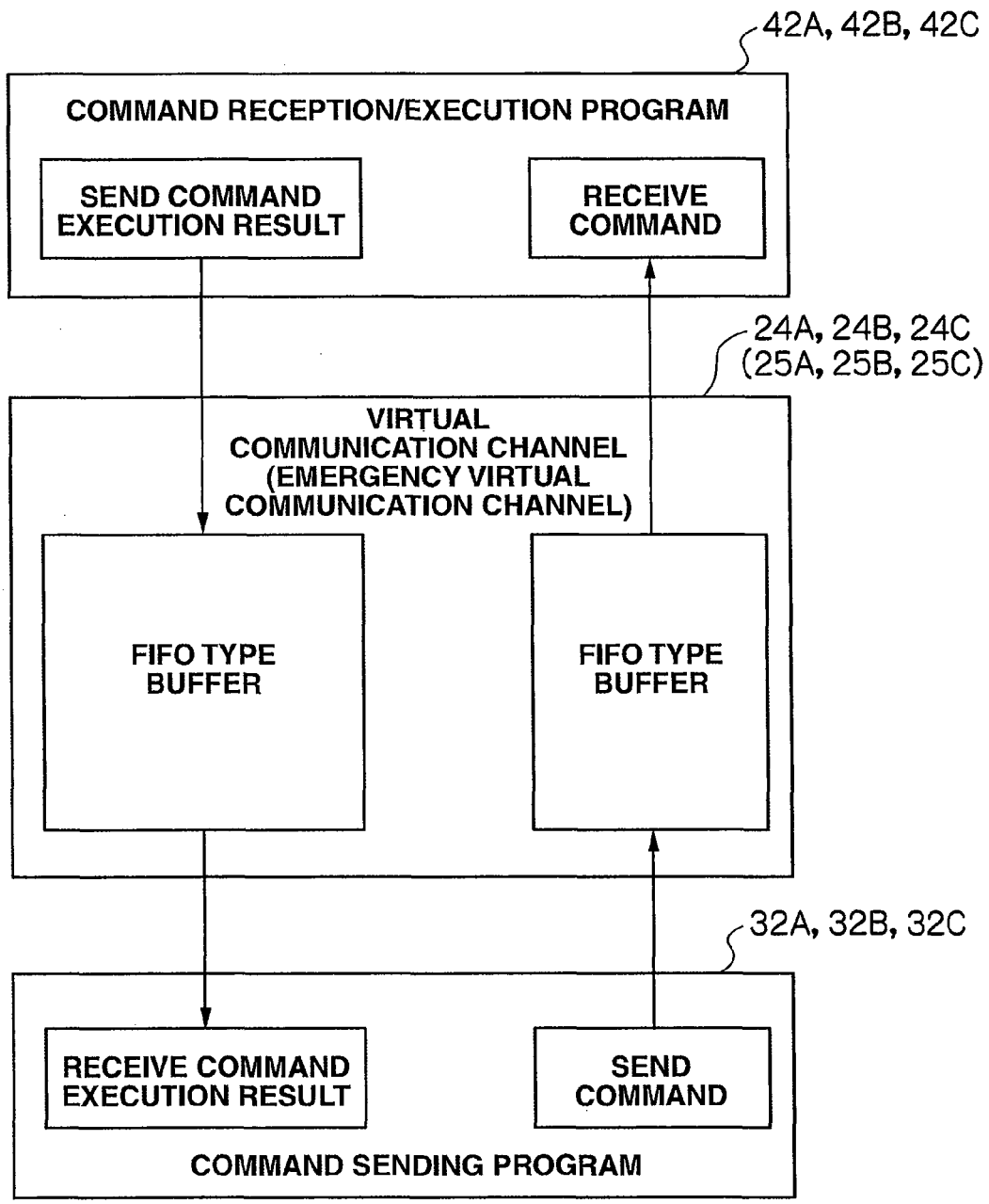
FIG. 7 is a conceptual diagram illustrating sending/reception of various commands.

FIG. 7 shows an example of various command sending/reception via the first, second, and $n^{th}$ virtual communication channels 24A, 24B, and 24C. The first, second, and $n^{th}$ virtual communication channels 24A, 24B, and 24C are FIFO (First In First Out) type buffers. When processing for creating the first, second, and $n^{th}$ emergency virtual communication channels 25A, 25B, and 25C is performed, the process IDs of processes using the first, second, and $n^{th}$ virtual communication channels 24A, 24B, and 24C are written in those channels (explained later).

The first, second, and $n^{th}$ command sending programs 32A, 32B, and 32C in the virtual NAS management program 23 write, for example, a command sent from the management computer 6 to the first, second, and $n^{th}$ virtual communication channels 24A, 24B, and 24C. The first, second, and $n^{th}$ command reception/execution programs 42A, 42B, and 42C in the first, second, and $n^{th}$ virtual NAS control programs 22A, 22B, and 22C read the command written in the first, second, and $n^{th}$ virtual communication channels 24A, 24B, and 24C in the order written.

The first, second, and $n^{th}$ command reception/execution programs 42A, 42B, and 42C in the first, second, and $n^{th}$ virtual NAS control programs 22A, 22B, and 22C also write command execution feedback to the first, second, and $n^{th}$ virtual communication channels 24A, 24B, and 24C. The first, second, and $n^{th}$ command sending programs 32A, 32B, and 32C in the virtual NAS management program 23 read the command execution feedback written in the first, second, and $n^{th}$ virtual communication channels 24A, 24B, and 24C in the order written.

Since the first, second, and $n^{th}$ emergency virtual communication channels 25A, 25B, and 25C are also FIFO type buffers similar to the first, second, and $n^{th}$ virtual communication channels 24A, 24B, and 24C, commands and command execution feedback are sent/received via the first, second, and $n^{th}$ emergency virtual communication channels 25A, 25B, and 25C in the same way as via the first, second, and $n^{th}$ virtual communication channels 24A, 24B, and 24C.

Figure 8:
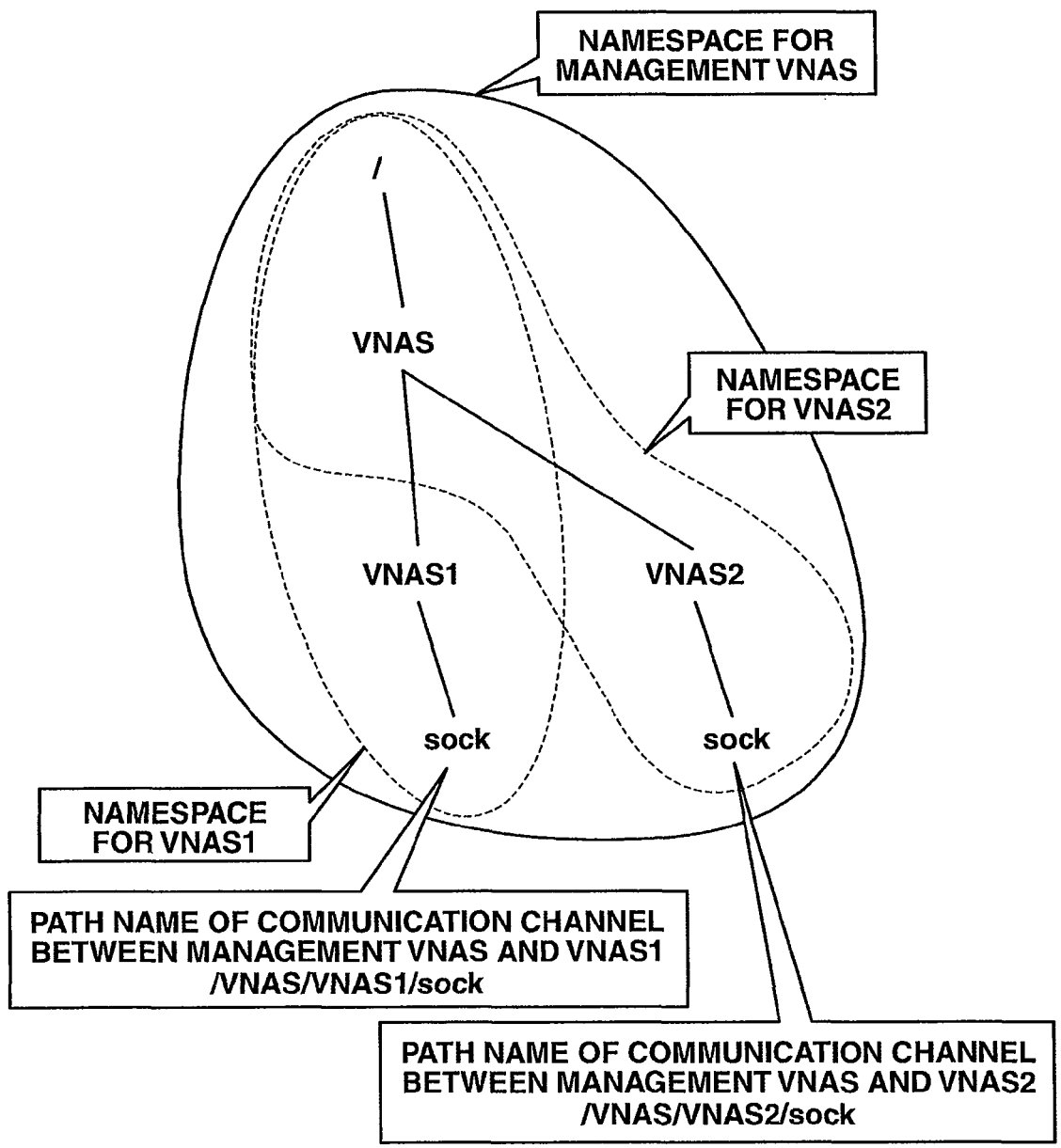
FIG. 8 is a conceptual diagram illustrating a namespace.

FIG. 8 shows an example of namespaces under the file system in the first and second NAS control programs 22A and 22B and the virtual NAS management program 23. Although the following description only mentions the namespaces for the first virtual NAS control program 22A, the virtual NAS management program 23, and the first virtual communication channel 24A, the same applies to the namespaces for the second virtual NAS control program 22B, the virtual NAS management program 23, and the second virtual communication channel 24B, and those for the $n^{th}$ virtual NAS control program 22C, the virtual NAS management program 23, and the $n^{th}$ virtual communication channel 24C.

The first virtual communication channel 24A is configured by enabling creation of a UNIX (registered trademark) domain socket in the file system in the memory 16 shared by the first virtual NAS control program 22A and the virtual NAS management program 23.

In other words, a proc FS (FS), which is the file system on the memory 16 between the first virtual NAS control program 22A and the virtual NAS management program 23 is mounted to be shared. A UNIX (registered trademark) domain socket is created in that proc FS, and interprocess communication across the first virtual NAS control program 22A and the virtual NAS management program 23 is enabled via the socket.

Since an existing proc FS is used in the method for creating a UNIX (registered trademark) domain socket in the proc FS and performing communication between the first virtual NAS control program 22A and the virtual NAS management program 23, it is not necessary to develop a new file system from scratch. Also, as it is not necessary to prepare a disk for communication channels, the cost can be kept low. It is also not necessary to separately prepare a communication network between the first virtual NAS control program 22A and the virtual NAS management program 23. The content of communication is not leaked outside the host computer 4. The communication load is low because processing for the TCP/IP stack is not performed. The above are the advantages of this method.

However, in the system in which a UNIX (registered trademark) domain socket is created to perform communication between the first virtual NAS control program 22A and the virtual NAS management program 23, if any sockets could be freely created anywhere other than between the first virtual NAS control program 22A and the virtual NAS management program 23 in the shared proc FS, free communication would be enabled among not only the first virtual NAS control program 22A and virtual NAS management program 23, but also other programs.

As a result, the high independence of the connection between the first virtual NAS control program 22A and the virtual NAS management program 23, and that between the second virtual NAS control program 22B and the virtual NAS management program 23 may be compromised, and damage security. Therefore, some restrictions on use of sockets are necessary.

In this embodiment, the use of sockets is restricted by providing the first virtual NAS control program 22A and the virtual NAS management program 23 respectively with proc FSs each having a different namespace.

It is assumed that in FIG. 8, "sock" (UNIX (registered trademark) domain socket), being an end-point of the "VNAS1" namespace, is provided with a path name of the "/VNAS/VNAS1/sock" virtual communication channel, and "sock" (UNIX (registered trademark) domain socket), being an end-point of the "VNAS2" namespace, is provided with a path name of the "/VNAS/VNAS2/sock" virtual communication channel. If those path names can be identified in a namespace (i.e., access can be made with those path names), communication can be performed.

As shown in FIG. 8, the "management VNAS" namespace includes the "VNAS1" and "VNAS2" namespaces, so the "management VNAS" can access the both "sock" files that are the end-points of the "VNAS1" and "VNAS2." However, the "VNAS1" and "VNAS2" can access only the "sock" file in their own namespace. Since a UNIX (registered trademark) domain socket can be created only for a "sock" file, communication can be made from the "management VNAS" to the "VNAS1" and "VNAS2", but cannot be made between the "VNAS1" and "VNAS2." In this way, one-on-one communication channels can be established respectively between the "management VNAS" and the "VNAS1," and between the "management VNAS" and the "VNAS2."

The storage apparatus 5 is designed for executing write processing for writing data such as files to an information storage medium such as a disk device or flash memory, or read processing for sending data such as files to the host computer 4, based on a write/read request sent from the host computer 4 via the LAN 7A. The storage apparatus 5 includes, for example, a control unit for controlling data I/O, a storage device unit having disk devices for storing data, and a maintenance terminal (not shown) for maintaining and managing the storage apparatus 4.

The disk devices in the storage device unit may be managed in a RAID (Redundant Array of Independent Disks) format by the control unit. If so, one or more logical volume(s) are set in a physical storage area provided by one or more disk devices. Data is stored in the logical volume(s) in units of blocks with a prescribed size (hereinafter referred to as "logical blocks").

Sometimes one or more additional logical volume(s) may be set in one or more logical volume(s). Each logical volume is provided with a specific identifier (hereinafter referred to as an "LUN (Logical Unit Number)"). Data I/O is performed by specifying an address, which is a combination of an LUN and a specific number (LBA: Logical Block Address) each logical block is provided with.

Figure 9:
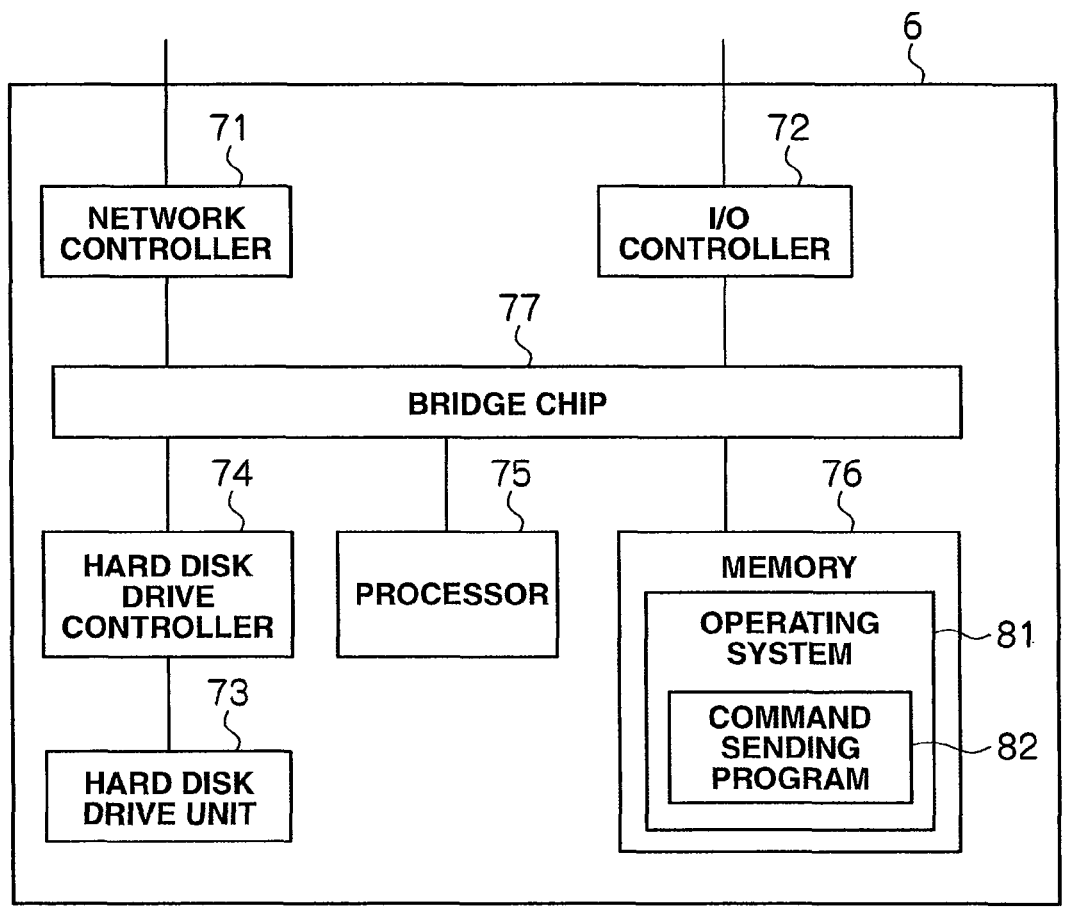
FIG. 9 is a block diagram showing a schematic configuration for a management computer.

FIG. 9 shows an example of a configuration for the management computer 6. The management computer 6 is designed for collectively managing the first, second, and $n^{th}$ virtual NAS control programs 22A, 22B, and 22C, and the virtual NAS management program 23. The management computer 6 sends various commands to the virtual NAS management program 23 in the host computer 4 and receives the command execution feedback from the virtual NAS management program 23.

The management computer 6 may be a personal computer or workstation with various possible configurations. For ease of explanation, the management computer 6 in this embodiment has the same configuration as that of the host computer 4, except for the programs and information stored in the memory. In other words, in the management computer 6, a hard disk drive controller 74, to which a network controller 71, an I/O controller 72, and a hard disk drive unit 73 are connected, is connected to a processor 75 and memory 76 via a bridge chip 77.

The memory 76 in the management computer 6 stores an operating system 81, which is a program for controlling the management computer 6. The operating system 81 has a command sending program 82 for sending various commands to the virtual NAS management program 23 in the host computer 4 and receiving command execution feedback from the virtual NAS management program 23.

Next, specific processing routines relating to various kinds of processing performed by the processor 15 in the host computer 4 in this storage system 1 will be described. Although various kinds of processing involving the first virtual NAS control program 22A, the virtual NAS management program 23, the first virtual communication channel 24A, the first emergency virtual communication channels 25A, and the file system processing program 26 will be explained in the following description, the explanation also applies to the processing involving the second virtual NAS control program 22B, the virtual NAS management program 23, the second virtual communication channel 24B, the second emergency virtual communication channel 25B, and the file system processing program 26; as well as the processing involving the $n^{th}$ virtual NAS control program 22C, the virtual NAS management program 23, the $n^{th}$ virtual communication channel 24C, the $n^{th}$ emergency virtual communication channel 25C, and the file system processing program 26.

Figure 10:
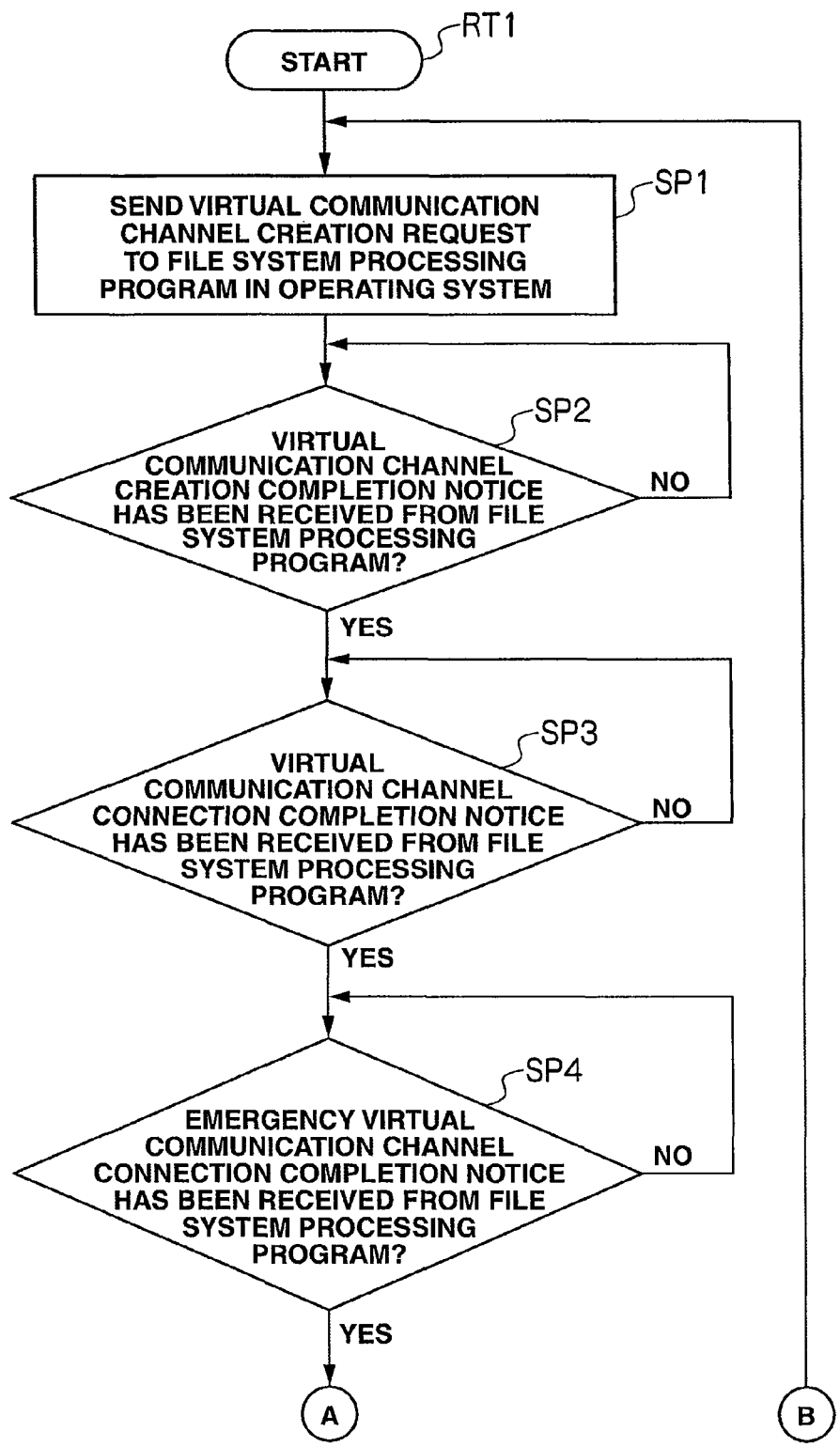
FIG. 10 is a flowchart showing a command reception/execution processing routine.
Figure 11:
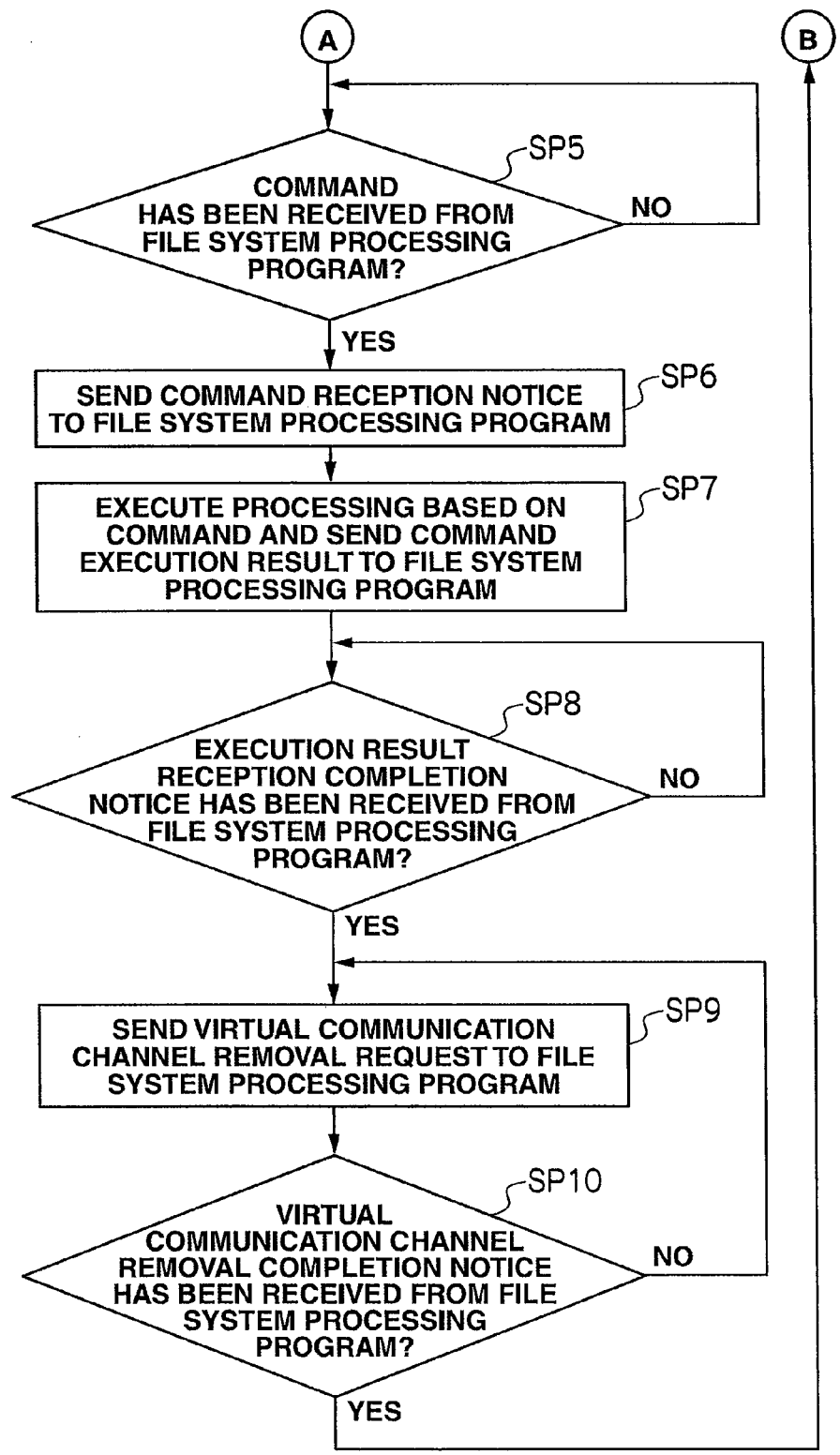
FIG. 11 is a flowchart showing a command reception/execution processing routine.

FIGS. 10 and 11 show an example of a flowchart of a specific processing routine performed by the processor 15 relating to reception of that command/execution processing in the host computer 4 in the storage system 1.

After the host computer 4 is started up, the processor 15 in the host computer 4 executes the first command reception/execution program 42A according to a command/execution processing routine RT1 shown in FIGS. 10 and 11, and first sends a virtual communication channel creation request, containing the path name of the "/VNAS/VNAS1/sock" virtual communication channel, to the file system processing program 26 (SP1).

Next, the processor 15 waits, in standby mode, for execution of the virtual communication channel creation processing routine RT3 (explained later) according to the sent virtual communication channel creation request by the execution of the file system processing program 26, and reception, from the file system processing program 26, of a notification (hereinafter referred to as a "virtual communication channel creation completion notification") indicating that the first communication channel 22A has been created (SP2). The virtual communication channel creation completion notification contains the column number of the file descriptor entry 28D in the process management table 28 that stores the "sock" file address.

If the processor 15 receives the virtual communication channel creation completion notification from the file system processing program 26 (SP2: YES), the processor 15 waits, in standby mode, for execution of the virtual communication channel connection processing routine RT5 by execution of the file system processing program 26, and reception, from the file system processing program 26, of a notification (hereinafter referred to as a "virtual communication channel connection completion notification") indicating that the first virtual communication channel 22A has been connected to the first command sending program 32A (SP3). The virtual communication channel connection completion notification contains the column number of the file descriptor 28D in the process management table 28 that stores the "sock" file addresses.

If the processor 15 receives the virtual communication channel connection completion notification from the file system processing program 26 (SP3: YES), the processor 15 then waits, in standby mode, for execution of the emergency virtual communication channel creation processing routine RT6, the virtual communication channel sending processing routine RT7, and the virtual communication channel reception processing routine RT8 (explained later) by execution of the file system processing program 26, and reception of a notification (hereinafter referred to as an "emergency virtual communication channel connection completion notification") indicating that the first emergency virtual communication channel 25A has been connected to the first command sending program 32A (SP4). The emergency virtual communication channel connection completion notification contains the column number of the file descriptor entry 28D in the process management table 28 that stores the address of an emergency communication file. The "emergency communication file" indicates a file necessary for connection with the first emergency virtual communication channel 25A.

If the processor 15 receives the emergency virtual communication channel connection completion notification from the file system processing program 26 (SP4: YES), the processor 15 waits, in standby mode, for execution of the virtual communication channel sending processing routine RT7 and the virtual communication channel reception processing routine RT8 (explained later) by execution of the file system processing program 26, and reception of any command from the file system processing program 26 (SP5).

If the processor 15 receives a command from the file system processing program 26 (SP5: YES), the processor 15 sends, to the file system processing program 26, a notification (hereinafter referred to as a "reception completion notification") indicating reception of that command (SP6).

Then the processor 15 executes processing according to the received command, and sends the command execution feedback to the file system processing program 26 (SP7).

Examples of the commands include a log collection command for collecting logs in the first virtual NAS control program 22A, a backup acquisition command for backing up data such as files stored in the first virtual NAS control program 22, and a processor load check command for checking a load on a processor that operates the first virtual NAS control program 22A.

For example, if the processor 15 receives a log collection command, the processor 15 executes log collection processing according to that command. In other words, if the processor 15 receives a log collection command, the processor 15 searches for log files in the first virtual NAS control program 22A to check whether or not the first virtual NAS control program 22A has any log files.

If the processor 15, receiving a log collection command, finds a log file in the first NAS control program 22A as a result of the accompanying search, the processor 15 sends the log file to the file system processing program 26. If no log file is found, the processor 15 sends an error message indicating that no log file was found to the file system processing program 26.

Next, the processor 15 waits, in standby mode, for execution of the virtual communication channel sending processing routine RT7 and the virtual communication channel reception processing routine RT8 (explained later) by execution of the file system processing program 26, and reception of a notification (hereinafter referred to as an "execution feedback reception completion notification") indicating that the command execution feedback has been received by the first command sending program 32A (SP8).

If the processor 15 receives the execution feedback reception completion notification (SP8: YES), the processor 15 sends a virtual communication channel removal request, containing the path name of the "/VNAS/VNAS1/sock/" virtual communication channel, to the file system processing program 26 in the operating system 21 (SP9).

Next, the processor 15 waits, in standby mode, for execution of the virtual communication channel removal processing routine RT9 (explained later) executed by execution of the file system processing program 26, and reception of a notification (hereinafter referred to as a "virtual communication channel removal completion notification) indicating that the first virtual communication channel 24A and the first emergency virtual communication channel 25A have been removed (SP10).

After that, if the processor 15 receives the virtual communication channel removal completion notification (SP10: YES), the processor 15 returns to step SP1 of sending the virtual communication channel creation request to the file system processing program 26, and repeats the same processing (SP1-SP10).

Figure 12:
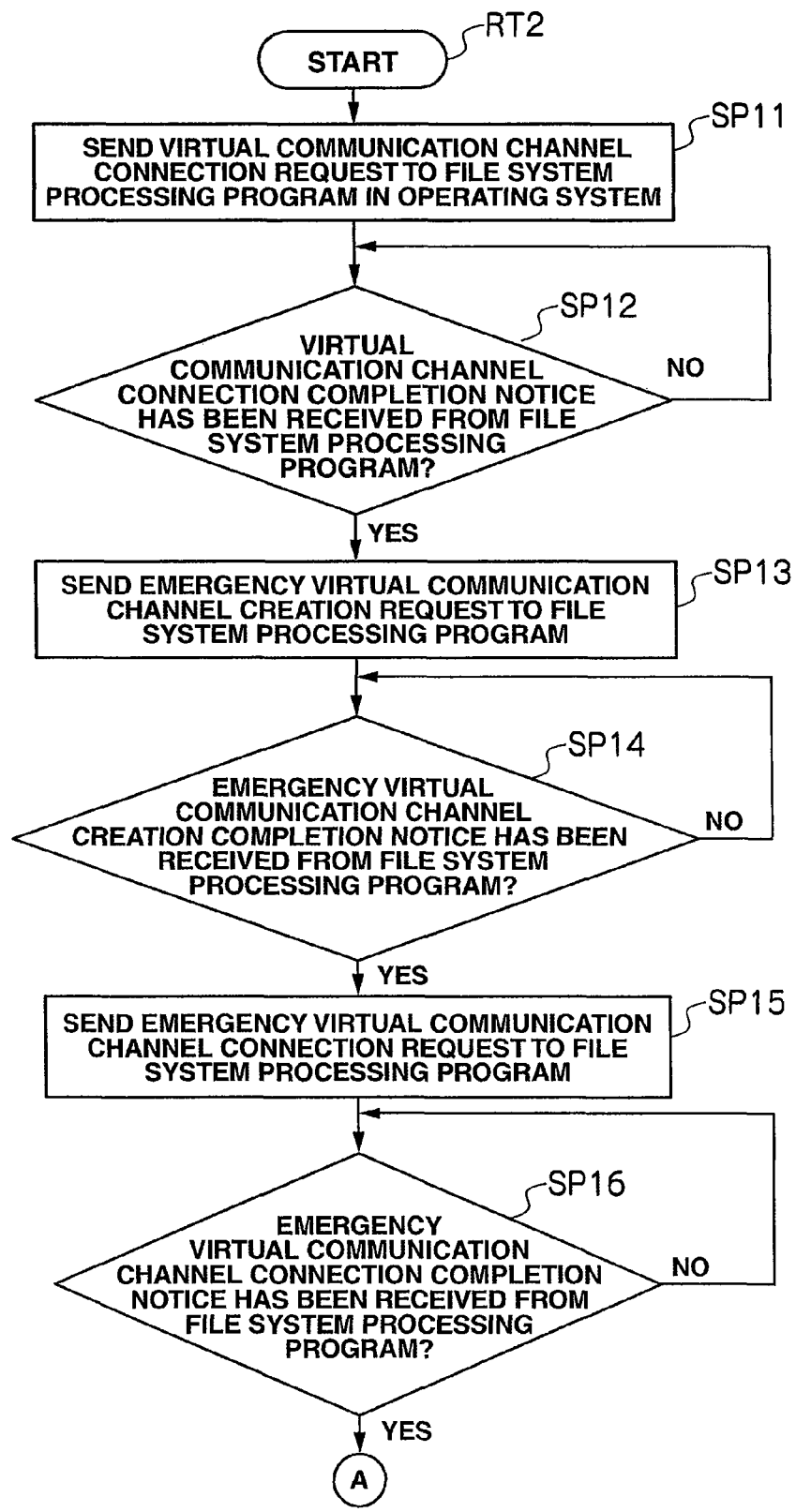
FIG. 12 is a flowchart showing a command sending processing routine.
Figure 13:
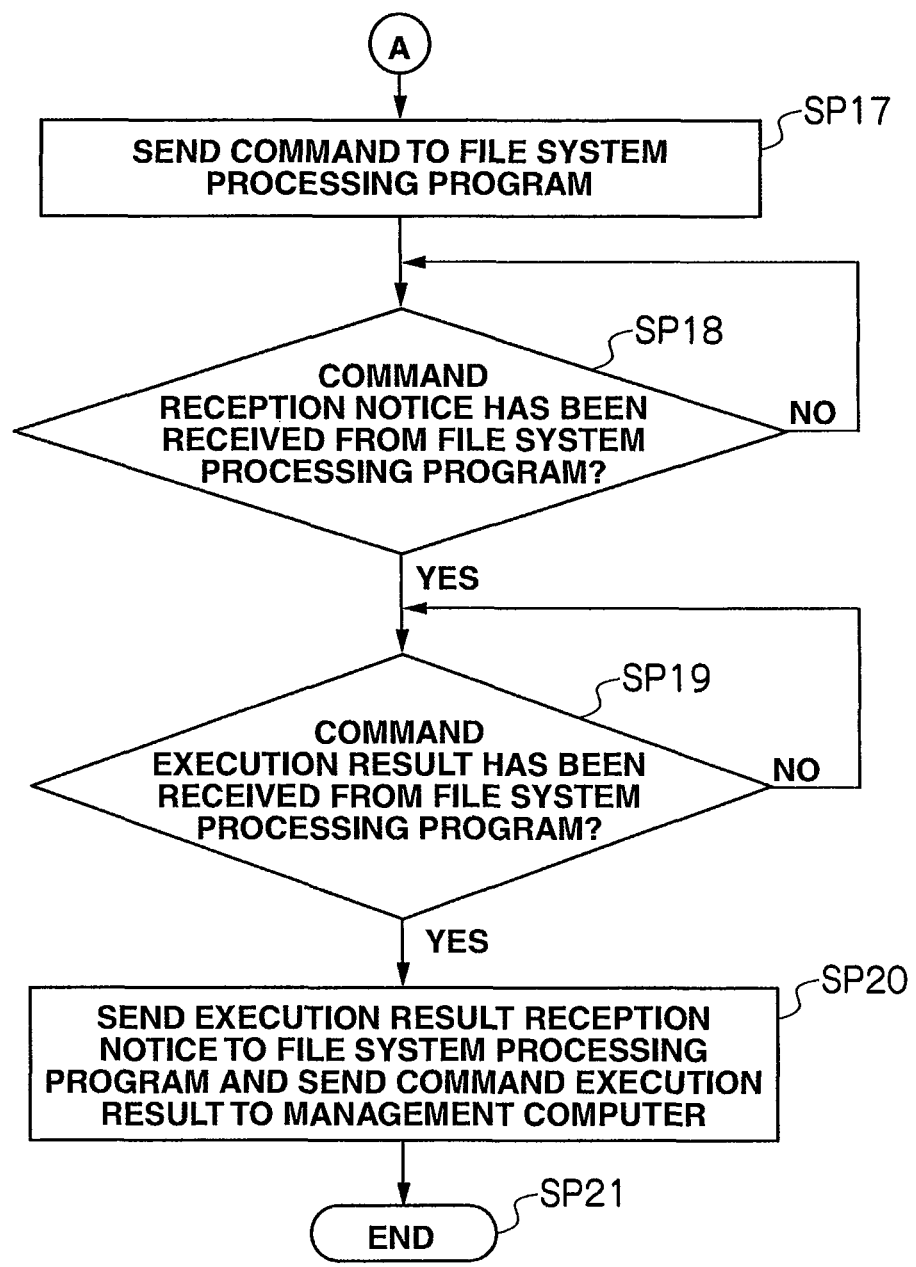
FIG. 13 is a flowchart showing a command sending processing routine.

FIGS. 12 and 13 show an example of a flowchart of a specific processing routine performed by the processor 15 relating to the command sending processing in the host computer 4 in the storage system 1.

After the management computer command reception program 31 in the virtual NAS management program 23 receives a command relevant to the first virtual NAS control program 22A sent from the management computer 6 via the LAN 7, the processor 15 in the host computer 4 executes the first command sending program 32A according to the command sending processing routine RT2 shown in FIGS. 12 and 13, and first sends the virtual communication channel connection request, containing the path name of the "/VNAS/VNAS1/sock" virtual communication channel, to the file system processing program 26 in the operating system 21 (SP11).

Next, the processor 15 waits, in standby mode, for execution of the virtual communication channel connection processing routine RT5 (explained later) by execution of the file system processing program 26 based on the virtual communication channel connection request, and reception, from the file system processing program 26, of a notification (hereinafter referred to as a "virtual communication channel connection completion notification) indicating that the first virtual communication channel 22A has been connected to the command/execution program 42A (SP12). The virtual communication channel connection completion notification contains the column number of the file descriptor entry 28D in the process management table 28 that stores the "sock" file address.

If the processor 15 receives the virtual communication channel connection completion notification from the file system processing program 26 (SP12: YES), the processor 15 sends the emergency virtual communication channel creation request to the file system processing program 26 (SP13).

Next, the processor 15 waits, in standby mode, for execution of the emergency virtual communication channel creation processing routine RT6 by execution of the file system processing program 26, and reception, from the file system processing program 26, of a notification (hereinafter referred to as an "emergency virtual communication channel creation completion notification) indicating that the first emergency virtual communication channel 25A has been created (SP14). The emergency virtual communication channel creation completion notification contains the column number of the file descriptor entry 28D in the process management table 28 that stores the emergency communication file address.

If the processor 15 receives the emergency virtual communication channel creation completion notification from the file system processing program 26 (SP14: YES), the processor 15 sends an emergency virtual communication channel connection request to the file system processing program 26 (SP15).

Next, the processor 15 waits, in standby mode, for execution of the virtual communication channel sending processing routine RT7 and the virtual communication channel reception processing routine RT8 (explained later) by execution of the file system processing program 26, and reception, from the file system processing program 26, of a notification (hereinafter referred to as an "emergency virtual communication channel connection completion notification) indicating that the first emergency virtual communication channel 25A has been connected to the first command reception/execution program 42A (SP16). The emergency virtual communication channel connection completion notification contains the column number of the file descriptor entry 28D in the process management table 28 that stores the emergency communication file address.

After that, if the processor 15 receives the emergency virtual communication channel connection completion notification from the file system processing program 26 (SP16: YES), the processor 15 sends, to the file system processing program 26, the command relevant to the first virtual NAS control program 22A received from the management computer 6 via the LAN 7 (SP17).

Next, the processor 15 waits, in standby mode, for execution of the virtual communication channel sending processing routine RT7 and the virtual communication channel reception routine RT8 (explained later) by execution of the file system processing program 26, and reception, from the file system processing program 26, of a notification (hereinafter referred to as a "command reception completion notification) indicating that the command has been received at the first command reception/execution program 42A (SP18).

After that, if the processor 15 receives reception of that command completion notification from the file system processing program 26 (SP18: YES), the processor 15 waits, in standby mode, for execution of the virtual communication channel sending processing routine RT7 and the virtual communication channel reception processing routine RT8 (explained later) by execution of the file system processing program 26, and reception of the command execution feedback from the file system processing program 26 (SP19). For example, if the processor 15 receives a log collection command from the management computer 6, the processor 15 then receives a relevant log file from the file system processing program 26 if the first virtual NAS control program 22A has the log file, or receives, from the file system processing program 26, an error message indicating that no log file has been found.

After that, if the processor 15 receives the command execution feedback from the file system processing program 26 (SP19: YES), the processor 15 sends, to the file processing program 26, a notification (hereinafter referred to as an "execution feedback reception completion notification") indicating that the processor 15 has received the command execution feedback, and executes the management computer command reception program 31 to send the command execution feedback to the management computer 6 via the LAN 7 (SP20).

After that, the processor 15 ends the command sending processing routine RT2 shown in FIGS. 12 and 13 (SP21).

Figure 14:
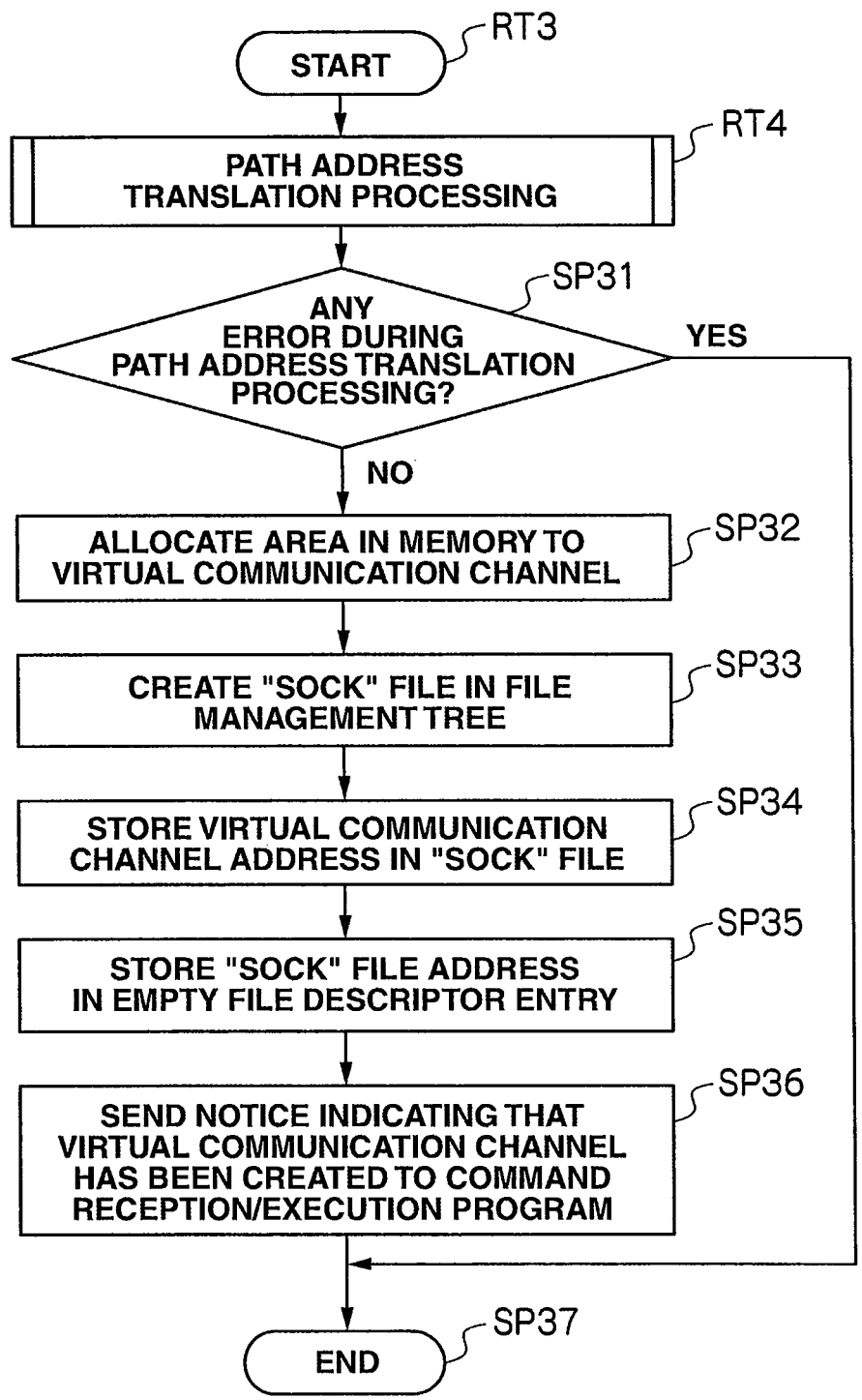
FIG. 14 is a flowchart showing a virtual communication channel creation processing routine.

FIG. 14 shows an example of a flowchart of a specific processing routine performed by the processor 15 relating to the virtual communication channel creation processing in the host computer 4 in the storage system 1.

After the virtual communication channel creation request containing the path name of the "/VNAS/VNAS1/sock" communication channel is sent from the first command reception/execution program 42A to the file system processing program 26, the processor 15 in the host computer 4 executes the virtual communication channel creation processing program 52 according to the virtual communication channel creation processing routine RT3 shown in FIG. 14, and first supplies the path name "/VNAS/VNAS1" of the path one level higher than the virtual communication channel to be created, to the path address translation processing program 51 to execute the path address translation processing (RT4).

Figure 15:
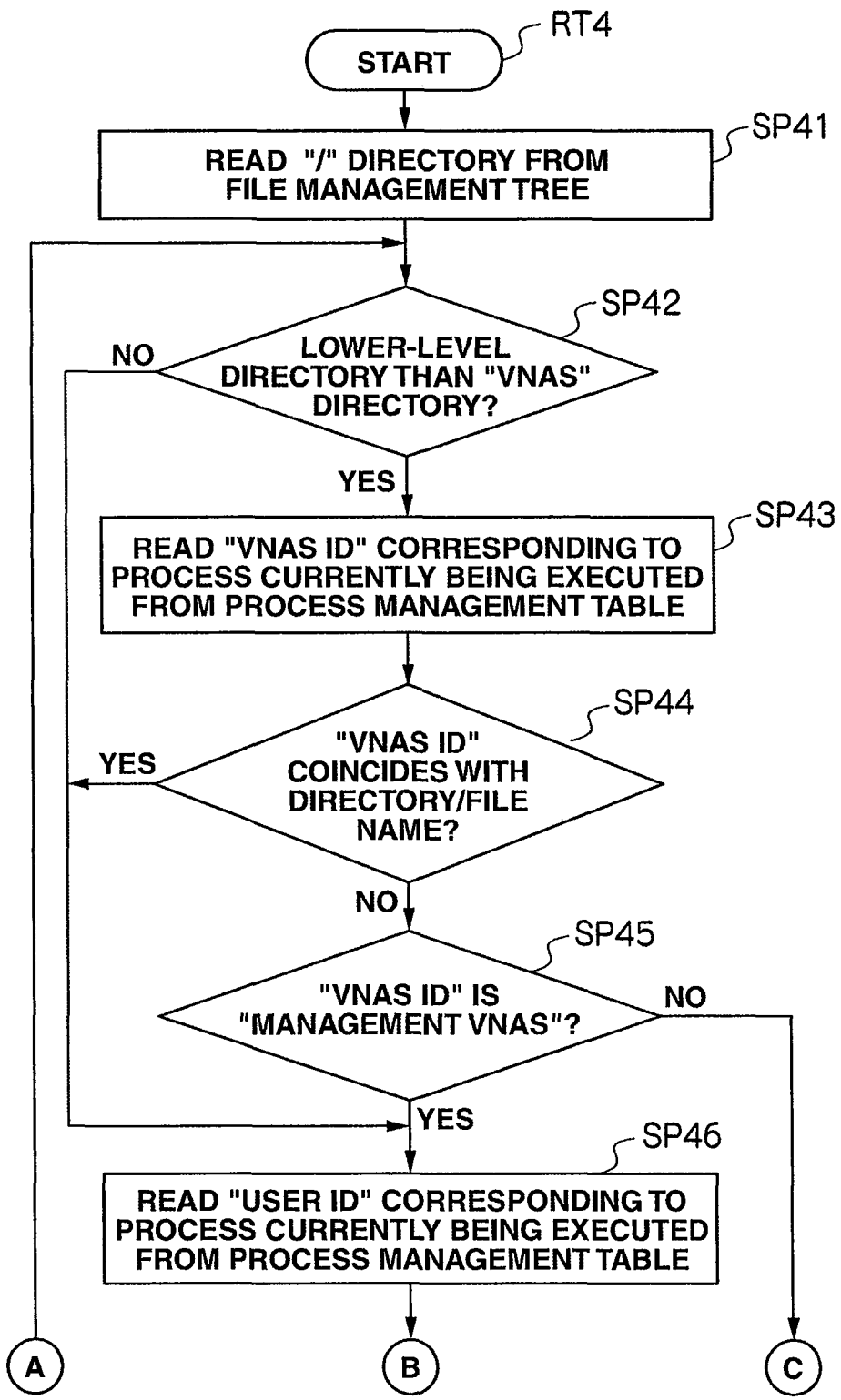
FIG. 15 is a flowchart showing a path address translation processing routine.
Figure 16:
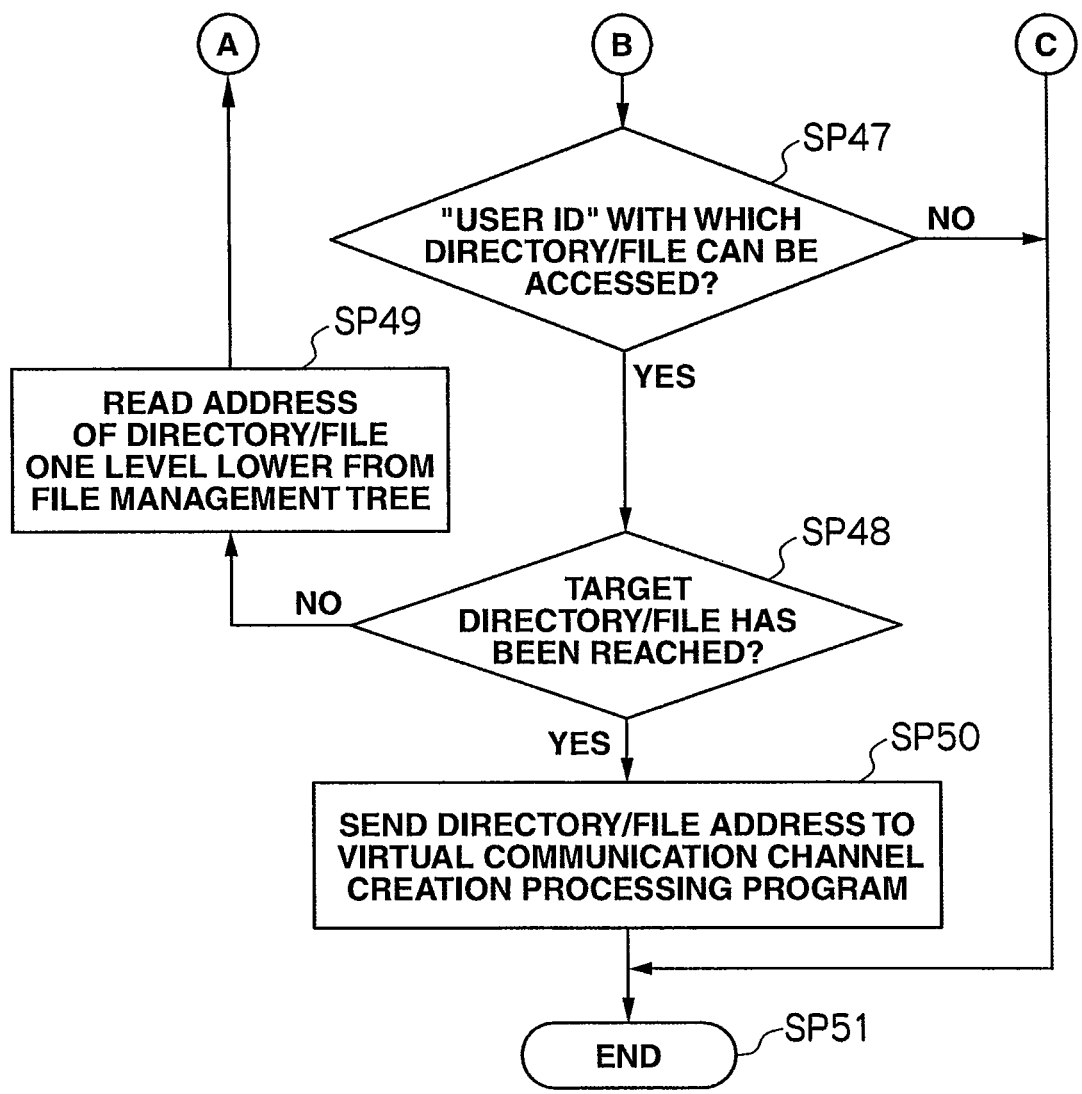
FIG. 16 is a flowchart showing a path address translation processing routine.

FIGS. 15 and 16 show an example of a flowchart of a specific processing routine performed by the processor 15 relating to the path address translation processing in the host computer 4 in the storage system 1.

After the path name of the path one level higher than the virtual communication channel to be created is supplied to the path address translation processing program 51, the processor 15 in the host computer 4 executes the path address translation processing program 51 according to the path address translation processing routine RT4 shown in FIGS. 15 and 16, and first reads the "/(root)" directory from the file management tree 27 by referring to the path name (SP41).

Next, the processor 15 executes the virtual communication channel access control program 61 and checks whether or not the directory/file read from the file management tree 27 is located in a level lower than the "VNAS" directory (SP42).

If the directory/file read from the file management tree 27 is not located in a level lower than the "VNAS" directory (SP42: NO), the processor 15 proceeds to step SP46.

Meanwhile, if the directory/file read from the file management tree 27 is located in a level lower than the "VNAS" directory (SP42: YES), the processor 15 refers to the process management table 28 and reads the "VNAS ID" stored as the VNAS ID entry 28C corresponding to the process ID of the process currently being executed by the processor 15 (SP43).

Next, the processor 15 checks whether or not the "VNAS ID" stored as the VNAS ID entry 28C corresponding to the process ID of the process currently being executed by the processor 15 matches (corresponds to) the directory/file name read from the file management tree 27 (SP44).

If the "VNAS ID" matches the directory/file name read from the file management tree 27 (SP44: YES), the processor 15 proceeds to step SP46.

Meanwhile, if the "VNAS ID" does not matches the directory/file name read from the file management tree 27 (SP44: NO), the processor 15 checks whether or not that "VNAS" is the "management VNAS" (SP45).

If the "VNAS ID" is not the "management VNAS" (SP45: NO), the processor 15 regards the result as an error, the processor 15 terminates the virtual communication channel access control program 61, and ends the path address translation processing routine RT4 shown in FIGS. 14 and 15 (SP51).

Meanwhile, if the "VNAS ID" is the "management VNAS" (SP45: YES), or if the directory/file read from the file management tree 27 is not located in a level lower than the "VNAS" directory (SP42: NO), or if the "VNAS ID" stored as the VNAS ID entry 28C corresponding to the process ID of the process currently being executed by the processor 15 matches the directory/file name read from the file management tree 27 (SP44: YES), the processor 15 ends the virtual communication channel access control program 61, and refers to the process management table 28 to read the "user ID" stored as the user ID entry 28B corresponding to the process ID of the process currently being executed by the processor 15 (SP46).

The processor 15 then refers to the user access permission entries 27C and the other user access permission entries 27D corresponding to the directory/file read from the file management tree 27 and checks whether or not the "user ID" stored as the user ID entry 28B corresponding to the process ID of the process currently being executed by the processor 15 is one able to access the file/directory (SP47).

If the "user ID" is not one able to access the file/directory (SP47: NO), the processor 15 regards that result as an error and then ends the path address translation processing routine RT4 shown in FIGS. 15 and 16 (SP51).

Meanwhile, if the "use ID" is one able to access the relevant directory/file (SP47: YES), the processor 15 checks whether or not the target directory/file has been reached (SP48).

If the target directory/file has not been reached (SP48: NO), the processor 15 refers to the relevant path name and reads a directory/file one level lower than the target directory/file from the file management tree 27 (SP49), then returns to SP42 for checking whether or not the directory/file read from the file management tree 27 is located in a level lower than the "VNAS" directory, and repeats the same processing (SP42-SP48).

Meanwhile, if the target directory/file has been reached (SP48: YES), the processor 15 sends the address of the directory/file with the path name to the virtual communication channel creation processing program 52 (SP50), and ends the path address translation processing routine RT4 shown in FIGS. 15 and 16 (SP51).

A more specific example of the path address translation processing routine RT 4 shown in FIGS. 15 and 16 will be described next. After the sent path name of the "/VNAS/VNAS1" virtual communication channel is given to the path address translation processing program 51, the processor 15 in the host computer 4 executes the command sending processing routine RT2 shown in FIGS. 12 and 13 and reads the "VNAS1" directory from the file management tree 27.

Next, the processor 15 reads "VNAS1" stored as the VNAS ID entry 28C in the process management table 28 corresponding to the process ID "3" of the first command reception/execution program 42A, which is the program currently being executed.

Next, since the "VNAS1" stored as the VNAS ID entry 28C matches the "VNAS1" directory name read from the file management tree 27, the processor 15 reads "1000" stored as the user ID entry 28B in the process management table 28 corresponding to the process ID "3" of the first command reception/execution program 42A that is the program currently being executed.

Next, the processor 15 refers to the user access permission entries 27C and the other user access permission entries 27D in the "VNAS1" directory read from the file management tree 27. Since "1000" stored as the user ID entry 28B corresponding to the process ID "3" of the first command reception/execution program 42A that is the program currently being executed is the "user ID" able to access the "VNAS1" directory, the processor 15 checks whether or not the target directory/file has been reached.

Since the "VNAS1" directory is the target directory/file, the processor 15 sends "0xc400020," which is the address of the "VNAS1" directory, to the virtual communication channel creation processing program 52.

Then the processor 15 returns to the flowchart in FIG. 14. After the "VNAS1" directory address "0xc4000020" or the error message is sent to the virtual communication channel creation processing program 52, the processor 15 checks whether or not any error has been caused during the path address translation processing (SP31).

If an error has been caused during the path address translation processing (SP31: YES), the processor 15 terminates the virtual communication channel creation processing routine RT3 shown in FIG. 14 (SP37).

Meanwhile, if no error has been caused during the path address translation processing (SP31: NO), the processor 15 allocates an area in the memory 16 to the virtual communication channel (SP32).

For example, if the "VNAS1" directory address "0xc4000020" is sent to the virtual communication channel creation processing program 52, the processor 15 allocates an area at the address "0xc4000020" in the memory 16 to the first virtual communication channel 24A.

Next, the processor 15, after allocating an area in the memory 16 to the first virtual communication channel 24A, stores the "sock" file address as the lower-level address entry 27G for the directory corresponding to the address received during the path address translation processing, and thus creates, in the file management tree 27, the "sock" file in a directory one level lower than the directory corresponding to the address received during the path address translation processing (SP33).

For example, the processor 15 allocates the address "0xc4000040" in the memory 16 to the "sock" file address, stores the "sock" file address "0xc4000040" as the lower-level address entry 27G for the "VNAS1" directory, and creates the "sock" file in a level lower than the "VNAS1" directory in the file management tree 27 (SP34).

Next, the processor 15 stores the virtual communication channel address as the virtual communication channel address entry 27E for the "sock" file (SP34).

For example, the processor 15 stores the address "0xc5000400" of the first virtual communication channel 24A as the virtual communication channel address entry 27E for the "sock" file.

Next, the processor 15 stores the "sock" file address in an empty file descriptor entry 28D in the process management table 28 corresponding to the process ID of the process currently being executed (SP35).

For example, as shown in FIG. 17, the processor 15 stores the "sock" file address "0xc4000040" in the "0" column in empty file descriptor entries 28D in the process management table 28 corresponding to the process ID "3" of the first command reception/execution program 42A, which is the process currently being executed.

Next, the processor 15 sends, to the first command reception/execution program 42A, a notification indicating that the first virtual communication channel 24A has been created (SP36), and ends the virtual communication channel creation processing routine RT3 shown in FIG. 14 (SP37).

Figure 18:
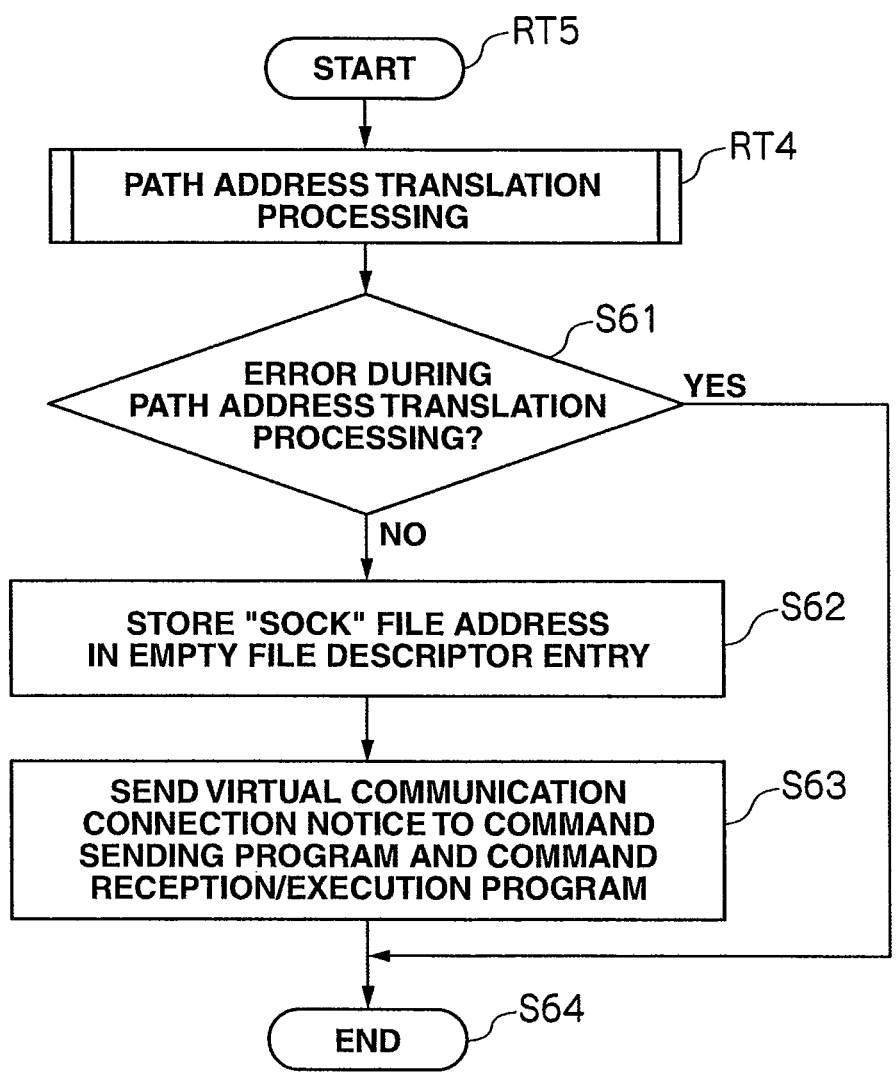
FIG. 18 is a flowchart showing a virtual communication channel connection processing routine.

FIG. 18 shows an example of a flowchart of a specific processing routine performed by the processor 15 relating to the virtual communication channel connection processing in the host computer 4 in the storage system 1.

After the virtual communication channel connection request containing the path name of the "/VNAS/VNAS1/sock" virtual communication channel is sent to the file system processing program 26 in the operating system 21, the processor 15 in the host computer 15 executes the virtual communication channel connection processing program 54 according to the virtual communication channel connection processing routine RT5 shown in FIG. 18, and first gives the path name of the "/VNAS/VNAS1/sock" virtual communication channel to the path address translation processing program 51 and executes the path address translation processing (RT4).

For example, after the path name of the "/VNAS/VNAS1/sock" virtual communication channel is given to the path address translation processing program 51, the processor 15 executes the path address translation processing program 51 to send the address "0xc4000040" of the "sock" file corresponding to the path name or an error message to the virtual communication channel connection processing program 54.

After the "sock" file address "0xc4000040" corresponding to the path name or an error message is sent to the virtual communication channel connection processing program 54, the processor 15 checks whether or not any error has been caused during the path address translation processing (SP61).

If an error has been caused during the path address translation processing (SP61: YES), the processor 15 terminates the virtual communication channel connection processing routine RT5 shown in FIG. 18 (SP64).

Meanwhile, if no error has been caused during the path address translation processing (SP61: NO), the processor 15 stores, as shown in FIG. 19, the "sock" file address "0xc4000040" in the empty file descriptor entry 28D in the column "0" in the process management table 28 corresponding to the process ID "2" of the command sending program 32, which is the process currently being executed, in the virtual NAS management program 23 (SP62).

Next, the processor 15 sends the virtual communication channel connection completion notification to the first command sending program 32A, executes the virtual communication channel sending processing routine RT7 and the virtual communication channel reception processing routine RT8 (explained later) to send the virtual communication channel connection completion notification to the first command reception/execution program 42A (SP63), and ends the virtual communication channel connection processing routine RT5 shown in FIG. 18 (SP64).

Figure 20:
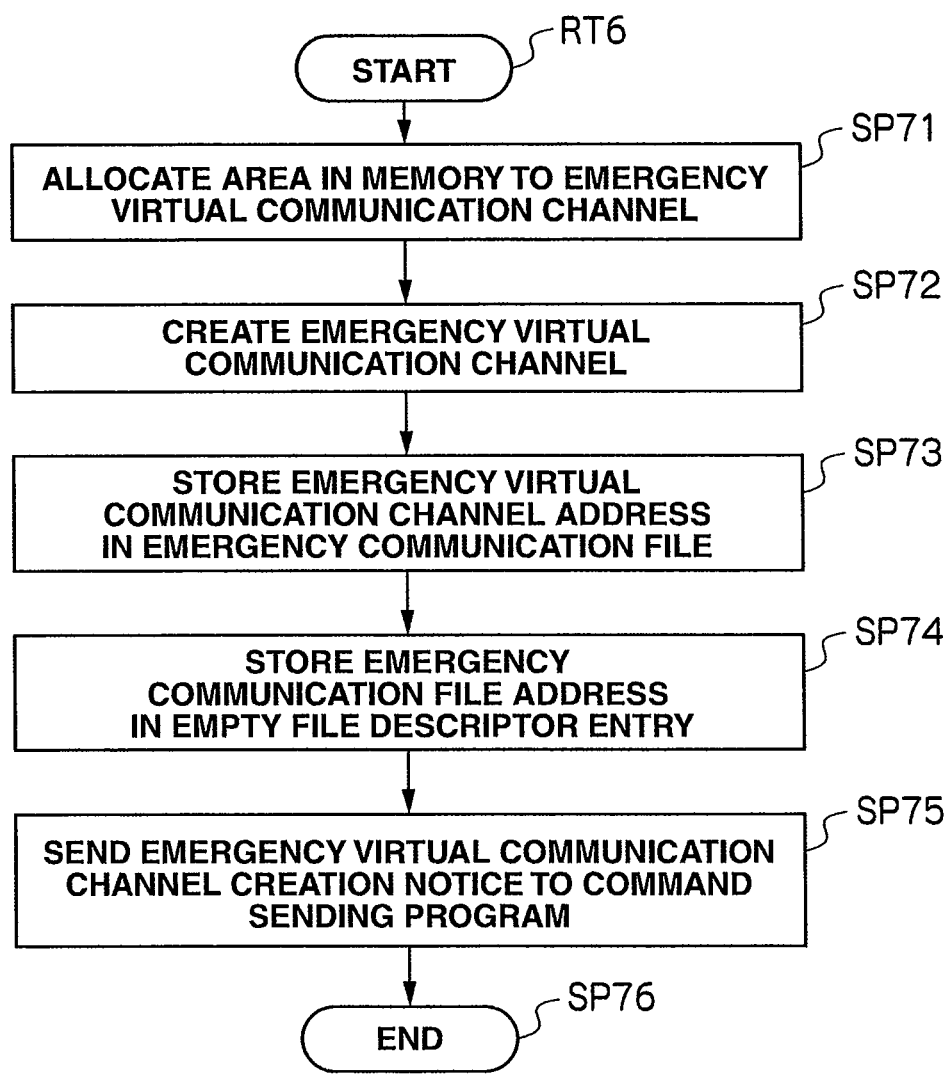
FIG. 20 is a flowchart showing an emergency virtual communication channel creation processing routine.

FIG. 20 shows an example of a flowchart of a specific processing routine performed by the processor 15 relating to the emergency virtual communication channel creation processing in the host computer 4 in the storage system 1.

After the emergency virtual communication channel creation request is sent from the first command sending program 32A to the file system processing program 26 in the operating system 21, the processor 15 in the host computer 4 executes the emergency virtual communication channel creation processing program 57 according to the emergency virtual communication channel creation processing routine RT6 shown in FIG. 20, and first allocates an area in the memory 16 to the first emergency virtual communication channel 25A (SP71).

For example, the processor 15 allocates an area at the address "0xc5000600" in the memory 16 to the first emergency virtual communication channel 25A.

Next, the processor 15 creates an emergency communication file by allocating an address in the memory 16 to the emergency communication file (SP72).

Figures 21, 22:
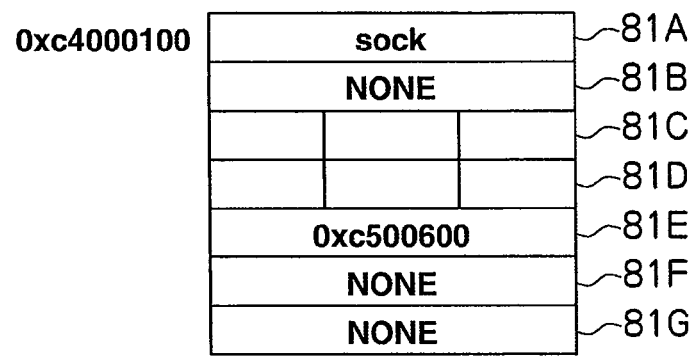
FIG. 21 is a conceptual diagram illustrating an emergency communication file.
FIG. 22 is a diagram showing a process management table used in the explanation of emergency virtual communication channel creation processing.

FIG. 21 shows an example of a configuration for the emergency communication file. The emergency communication file has the same configuration as the files/directories shown in FIG. 6, and includes a file name entry 81A, user ID entry 81B, user access permission entries 81C, other user access permission entries 81D, emergency virtual communication channel address entry 81E, higher-level address entry 81F, and lower-level address entry 81G.

There are no higher-level or lower-level files/directories above or below the emergency communication file. The emergency communication file is designed to store the first emergency virtual communication channel 25A, and exists independently in the memory 16. For ease of explanation, the address in the memory 16 at which the emergency communication file is stored is shown at the upper left space of the emergency communication file.

Next, the processor 15 stores the emergency virtual communication channel address as the emergency virtual communication channel address entry 81E in the emergency communication file (SP73).

For example, the processor 15 stores the address "0xc5000600" of the first emergency virtual communication channel 25A as the emergency virtual communication channel address entry 81E in the emergency communication file.

Next, the processor 15 stores the emergency communication file address in an empty file descriptor entry 28D in the process management table 28 corresponding to the process ID of the process currently being executed (SP74).

For example, as shown in FIG. 22, the processor 15 stores the emergency communication file address "0xc4000100" in the column "1" in empty file descriptor entries 28D in the process management table 28 corresponding to the process ID of the process currently being executed.

Next, the processor 15 sends, to the first command sending program 32A in the virtual NAS management program 23, a notification indicating that the first emergency virtual communication channel 25A has been created (SP75), and ends the emergency virtual communication channel creation processing routine RT6 (SP76).

Figure 23:
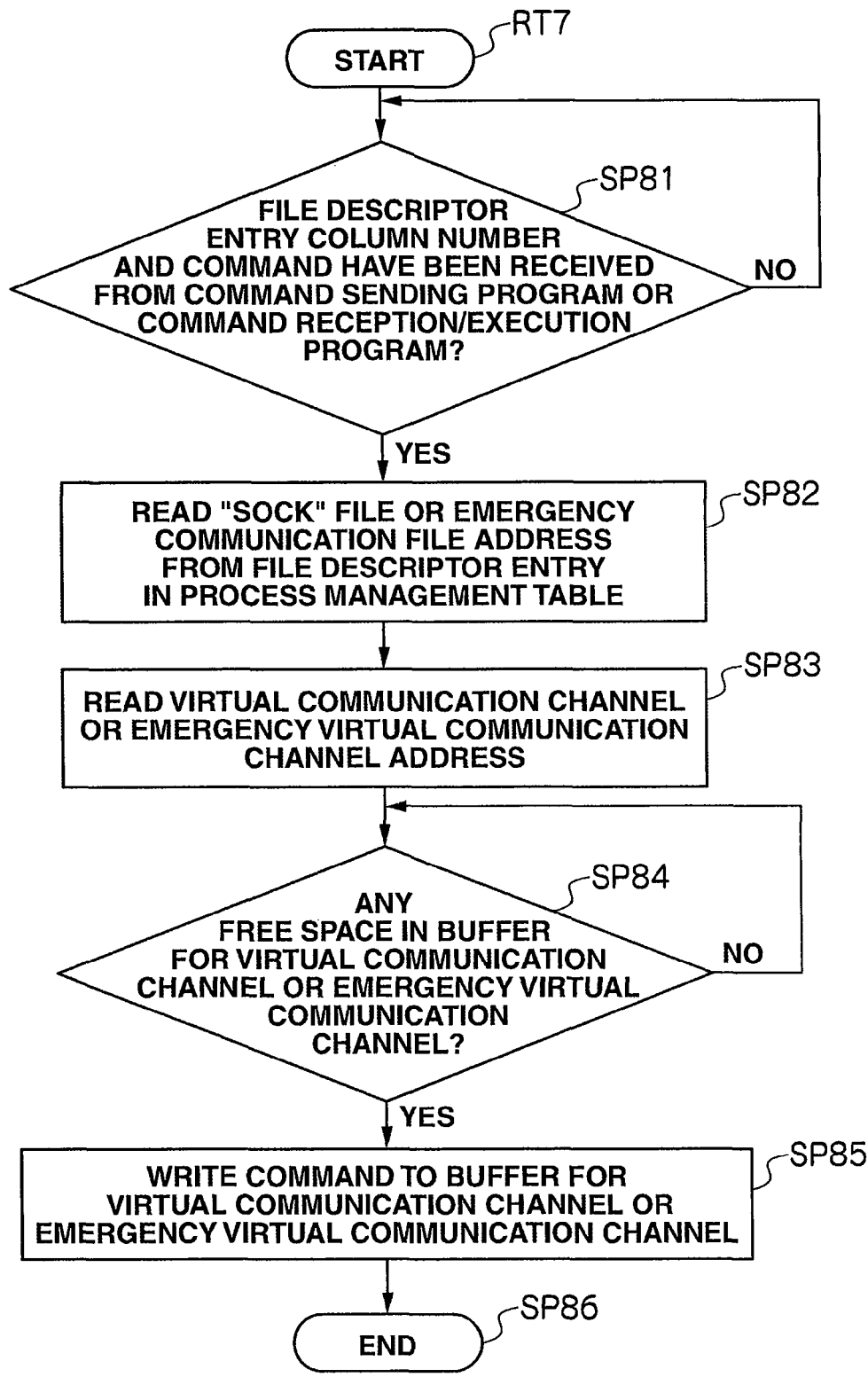
FIG. 23 is a flowchart showing a virtual communication channel sending processing routine.

FIG. 23 shows an example of a flowchart of a specific processing routine performed by the processor 15 relating to the virtual communication channel sending processing in the host computer 4 in the storage system 1.

After the virtual communication channel creation processing routine RT3 ends, the processor 15 executes the virtual communication channel sending processing program 55 according to the virtual communication channel sending processing routine RT8 shown in FIG. 23, and waits, in standby mode, for reception of a command and the column number of the file descriptor entry 28D in the process management table 28 in which the "sock" file address or the error communication program 32A is stored (SP81).

If the processor 15 receives, from the first command sending program 32A or the first command reception/execution program 42A, a command and the column number of the file descriptor entry 28D in the process management table 28 in which the "sock" file or the emergency communication file is stored (SP81: YES), the processor 15 reads the "sock" file address or the emergency communication file address from the relevant file descriptor entry 28D in the process management table 28 (SP82).

Next, the processor 15 refers to the above read "sock" file or emergency communication file, and reads the address of the first virtual communication channel 24A stored as the virtual communication channel address entry 27E corresponding to the "sock" file or the address of the first emergency virtual communication channel 25A stored as the emergency virtual communication channel address entry 81E corresponding to the emergency communication file (SP83).

Next, the processor 15 refers to the above read address of the first virtual communication channel 24A or the first emergency virtual communication channel 25A, and checks whether or not any free space remains in the buffer for the first virtual communication channel 24A or the first emergency virtual communication channel 25A (SP84).

If no free space remains in the buffer for the first virtual communication channel 24A or the first emergency virtual communication channel 25A (SP84: NO), the processor 15 waits, in standby mode, for space in the buffer for the first virtual communication channel 24A or the first emergency virtual communication channel 25A to become free.

Meanwhile, if free space exists in the buffer for the first virtual communication channel 24A or the first emergency virtual communication channel 25A (SP84: YES), the processor 15 writes the received command to the buffer for the first virtual communication channel 24A or the first emergency virtual communication channel 25A (SP85), and ends the virtual communication channel sending processing routine RT7 shown in FIG. 23 (SP86).

If the emergency virtual communication channel connection request containing the emergency communication file address "0xc4000100" is sent from the first command sending program 32A, the processor 15 reads the "sock" file address "0xc4000040" from the relevant file descriptor entry 28D in the process management table 28.

Next, the processor 15 reads the address "0xc5000400" in the first virtual communication channel 24A stored in the virtual communication channel address entry 27E in the "sock" file.

Next, if free space remains in the buffer for the first virtual communication channel 24A or the first emergency virtual communication channel 25A, the processor 15 writes the virtual communication channel connection request containing the address "0xc4000100" of the received emergency communication file to the address "0xc5000400" of the first virtual communication channel 24A in the buffer.

Also, if a log collection command is sent from the first command sending program 32A, the processor 15 writes the log collection command to the address "0xc5000400" of the first virtual communication channel 24A in the buffer.

Also, if a log collection command execution feedback or a log collection command execution feedback reception completion notification is sent from the first command reception/execution program 42A, the processor 15 writes it to the address "0xc5000400" of the first virtual communication channel 24A in the buffer.

For example, if an error message is sent from the first command reception/execution program 42A, the processor 15 writes it to the address "0xc5000600" of the first emergency virtual communication channel 25A in the buffer.

Figure 24:
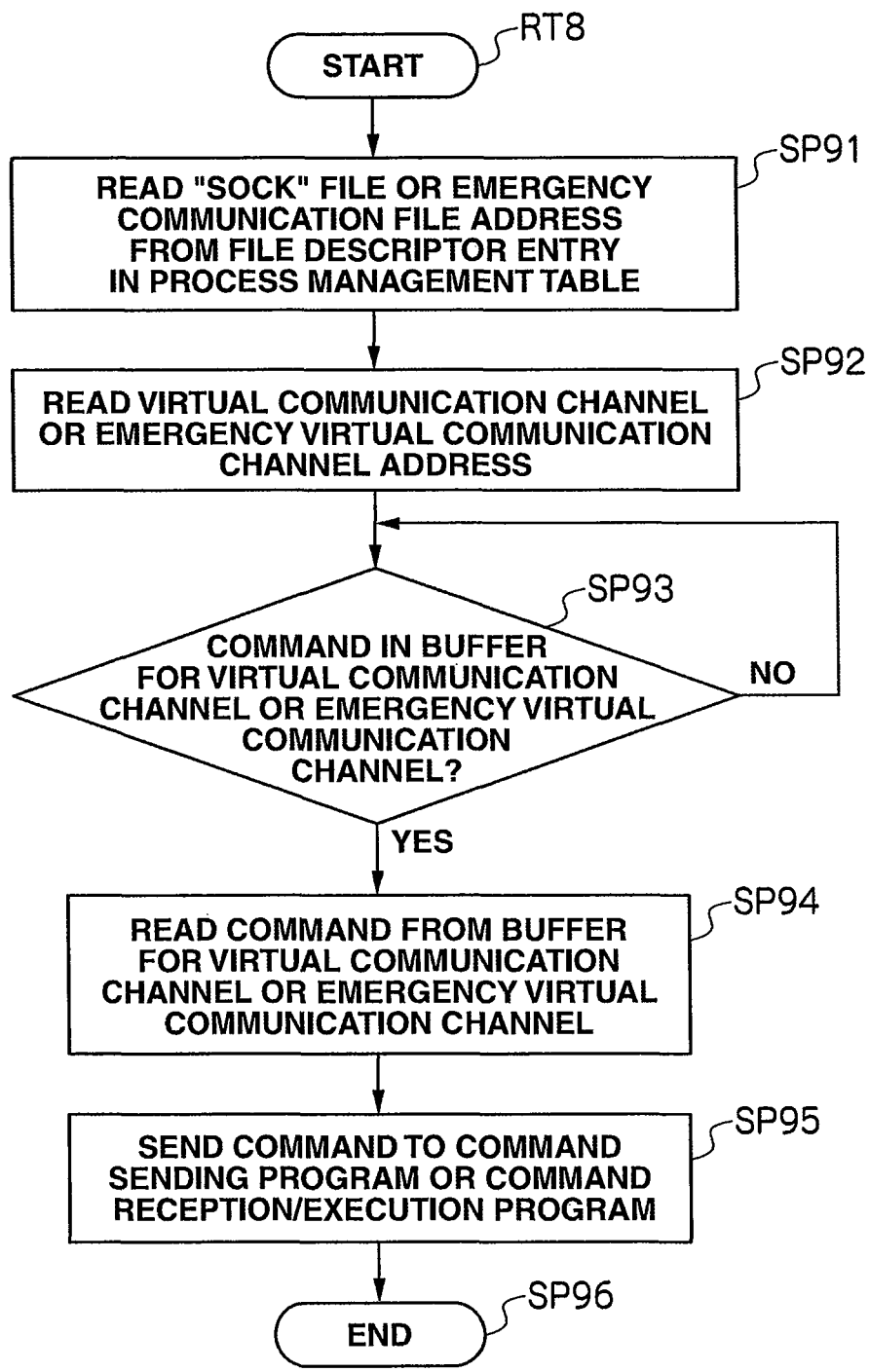
FIG. 24 is a flowchart showing a virtual communication channel reception processing routine.

FIG. 24 shows an example of a flowchart of a specific processing routine performed by the processor 15 relating to the virtual communication channel reception processing in the host computer 4 in the storage system 1.

After the virtual communication channel creation processing routine RT3 ends, the processor 15 in the host computer 4 executes the virtual communication channel reception processing program 56 according to the virtual communication channel reception processing routine RT8 shown in FIG. 24, and first reads the address of the "sock" file and/or the emergency communication file from the file descriptor entry 28D in the process management table 28 (SP91).

Next, the processor 15 refers to the address of the read "sock" file and/or emergency communication file and reads the address of the first virtual communication channel 24A stored as the virtual communication channel address entry 27E for the "sock" file and/or the first emergency virtual communication channel 25A stored as the emergency virtual communication channel address entry 81E for the emergency communication file (SP92).

Next, the processor 15 refers to the above read address of the first virtual communication channel 24A and/or the first emergency virtual communication channel 25A and checks whether or not any command is stored in the buffer for the first virtual communication channel 24A and/or the first emergency virtual communication channel 25A (SP93).

If the addresses of both the "sock" file and the emergency communication file are read from the file descriptor entries 28D in the process management table 28, the processor 15 checks both the addresses of the first virtual communication channel 24A and the first emergency virtual communication channel 25A.

If no command is stored in the buffer for the first virtual communication channel 24A and/or the first emergency virtual communication channel 25A (SP93: NO), the processor 15 waits, in standby mode, for a command to be stored in the buffer for the first virtual communication channel 24A and/or the first emergency virtual communication channel 25A. Meanwhile, if a command has been stored in the buffer for the first virtual communication channel 24A or the first emergency virtual communication channel 25A (SP93: YES), the processor 15 reads the command from the buffer for the first virtual communication channel 24A or the first emergency virtual communication channel 25A (SP85).

Next, the processor 15 sends the above read command to the first command sending program 32A or the first command reception/execution program 42A (SP95), and ends the virtual communication channel reception processing routine RT8 shown in FIG. 24 (SP96).

Figure 25:
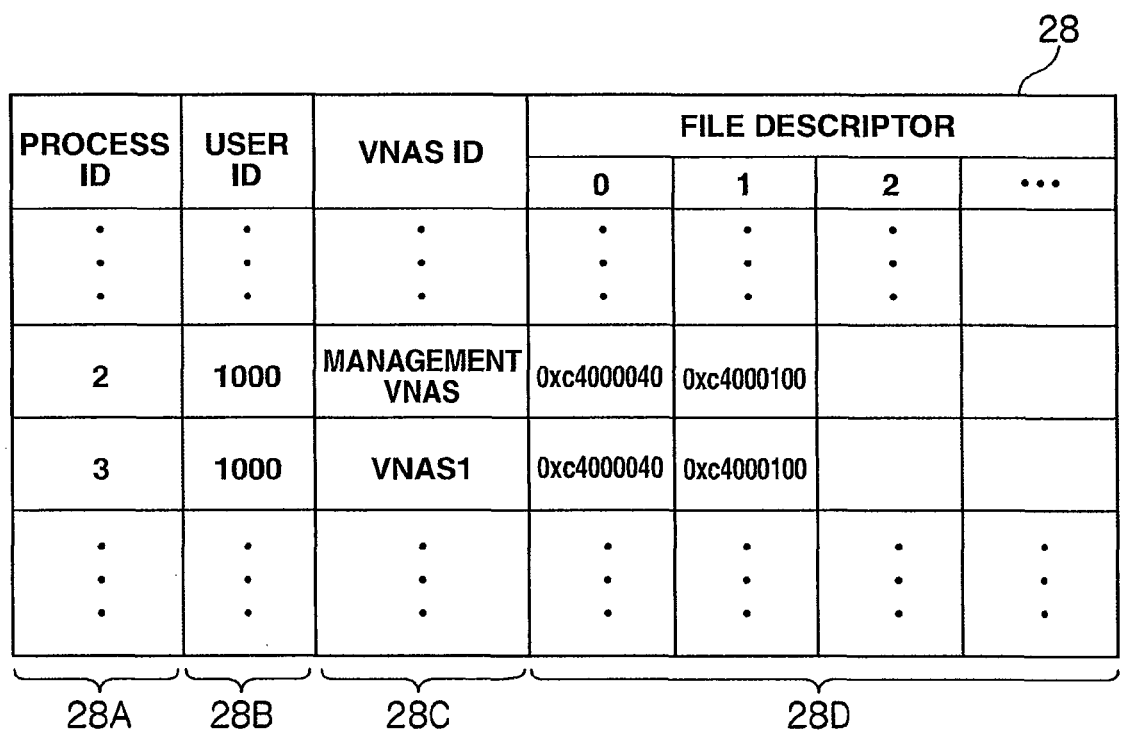
FIG. 25 is a diagram showing a process management table used in the explanation of virtual communication channel reception processing.

If the emergency virtual communication channel connection request containing the emergency communication file address "0xc4000100" is written by the first command sending program 32A to the address "0xc5000400" of the first virtual communication channel 24A, the processor 15 stores the emergency communication file address "0xc4000100" in the empty file descriptor entry 28D in the column "1" in the process management table 28 corresponding to the process ID "3" of the first command reception/execution program 42A, which is the process currently being executed, as shown in FIG. 25.

Alternately, instead of sending the above read command to the first command sending program 32A or the first command reception/execution program 42A (SP95), the processor 15 sends the emergency virtual communication channel connection completion notification to the first command reception/execution program 42A, executes the virtual communication channel sending processing routine RT7 and the virtual communication channel reception processing routine RT8 to send the emergency virtual communication channel connection completion notification to the first command sending program 32A.

For example, if a log collection command is written at the address "0xc5000400" of the first virtual communication channel 24A in the buffer, the processor 15 reads the log collection command from that address.

Also, if, for example, the log command execution feedback or the log collection command execution feedback reception completion notification was written, the processor 15 reads it from the address "0xc5000400" of the first virtual communication channel 24A in the buffer.

If an error message is written to the address "0xc5000600" of the first emergency virtual communication channel 25A in the buffer, the processor 15 reads the error message from that address in the buffer.

Figure 26:
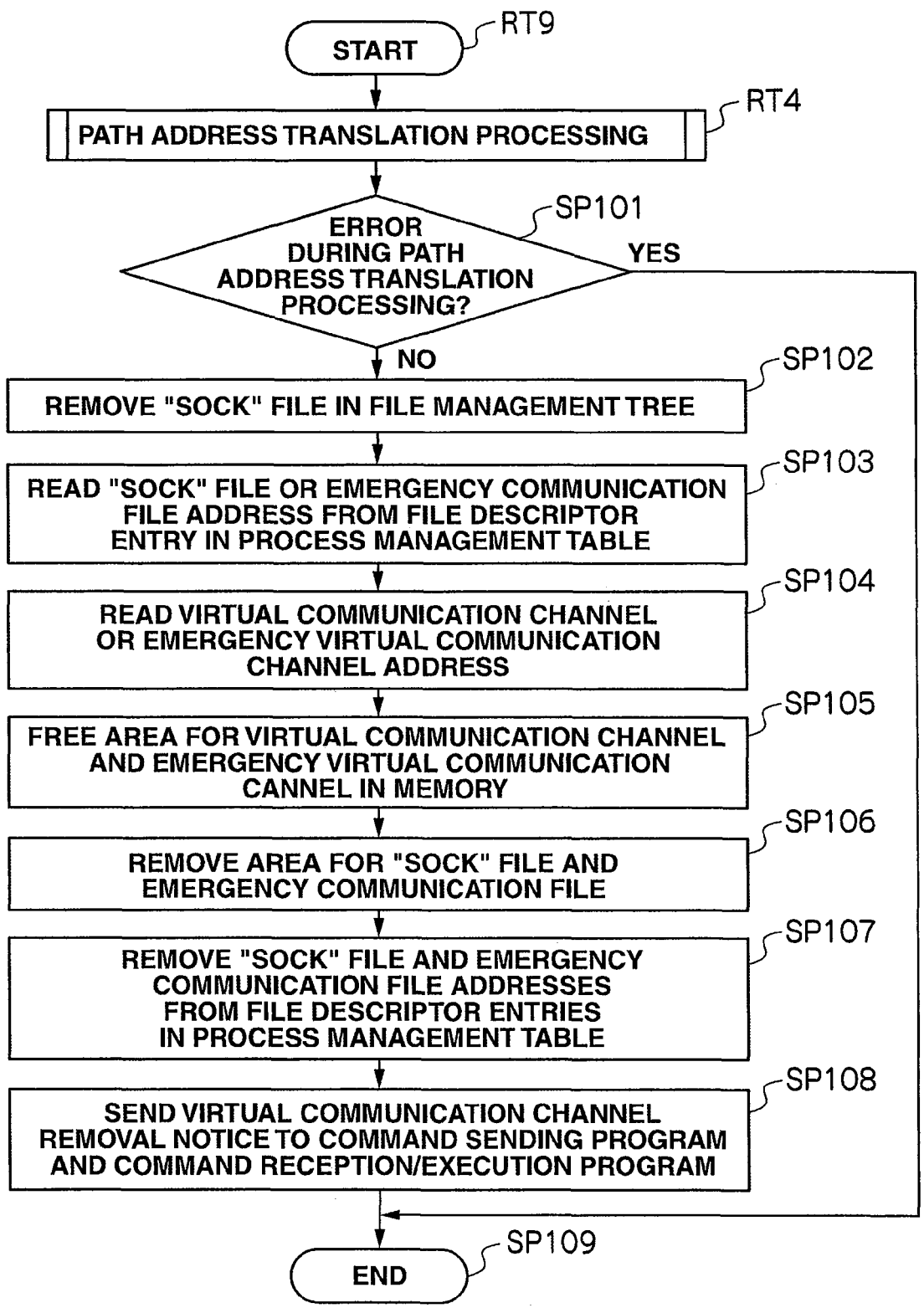
FIG. 26 is a flowchart showing a virtual communication channel removal processing routine.

FIG. 26 shows an example of a flowchart of a specific processing routine performed by the processor 15 relating to the virtual communication channel removal processing in the host computer 4 in the storage system 1.

After the virtual communication channel removal request containing the path name of the "/VNAS/VNAS1/sock" virtual communication channel is sent from the first command reception/execution program 42 in the virtual NAS control program 23 to the file system processing program 26 in the operating system 21, the processor 15 in the host computer 4 executes the virtual communication channel removal processing program 53 according to the virtual communication channel removal processing routine RT9 shown in FIG. 26, and first sends, to the path address translation processing program 51, the path name "/VNAS/VNAS1" of the path one level higher than the virtual communication channel to be removed, and executes the path address translation processing (RT4).

After the path name of the "/VNAS/VNAS1" virtual communication channel is sent to the path address translation processing program 51, the processor 15 executes the path address translation processing program 51 and sends the "VNAS1" directory address "0xc4000020" corresponding to the path name, or an error message, to the virtual communication channel creation processing program 52.

After the "VNAS1" directory address "0xc4000020" corresponding to the path name or an error message is sent to the virtual communication channel removal processing program 53, the processor 15 checks whether or not any error has been caused during the path address translation processing (SP101).

If any error has been caused during the path address translation processing (SP101: YES), the processor 15 terminates the virtual communication channel removal processing routine RT9 shown in FIG. 26 (SP109).

Meanwhile, if no error has been caused during the path address translation processing (SP101: NO), the processor 15 removes the "sock" file in the file management tree 27 one level lower than the directory corresponding to the address received during the path address translation processing by removing the "sock" file address stored as the lower-level address entry 27G for the directory corresponding to the address received during the path address translation processing (SP102).

In this example, the processor 15 removes the "sock" file one level lower than the "VNAS1" directory in the file management tree 27 by removing the "sock" file address "0xc4000040" stored as the lower-level address entry 27G for the "VNAS1" directory.

Next, the processor 15 reads the "sock" file address "0xc4000040" stored in the column "0" in the file descriptor entry 28D in the process management table 28 corresponding to the process ID "2" of the command sending program 32A in the NAS management program 23, which is the process currently being executed, and the address "0xc4000100" of the emergency communication file stored in the column "1" in the file descriptor entry 28D in the process management table 28 corresponding to the process ID "3" of the command/execution program 42A relevant to the above process ID "2" (SP103).

Next, the processor 15 refers to the above read "sock" file address "0xc4000040" and the emergency communication file address "0xc4000100" and reads the address "0xc5000400" of the first virtual communication channel 24A stored as the virtual communication channel address entry 27E for the "sock" file and the address "0xc5000600" of the first emergency virtual communication channel 25A stored as the emergency virtual communication channel address entry 81E for the emergency communication file (SP104).

Next, the processor 15 frees the area in the memory 16 at the address "0xc5000400" of the first virtual communication channel 24A and at the address "0xc5000600" of the first emergency virtual communication channel 25A (SP105).

Next, the processor 15 frees the area in the memory 16 at the "sock" file address "0xc4000040" and at the emergency communication file address "0xc4000100" (SP106).

Next, the processor 15 removes the "sock" file address "0xc4000040" stored in the column "0" in the file descriptor entry 28D in the process management table 28 corresponding to the process ID "2" of the command sending program 32A in the NAS management program 23, which is the process currently being executed, and the emergency communication file address "0xc4000100" stored in the column "1" in the file descriptor entry 28D corresponding to the process ID "3" of the first command reception/execution program 42A relevant to the above process ID "2" (SP107).

Next, the processor 15 sends, to the first command sending program 32A, a notification (hereinafter referred to as a "virtual communication removal completion notification") indicating that the first virtual communication channel 24A and the first emergency virtual communication channel 25A have been removed, executes the virtual communication channel sending processing routine RT7 and the virtual communication channel reception processing routine RT8 to send the virtual communication channel removal completion notification also to the first reception/execution program 42A (SP108), and ends the virtual communication channel removal processing routine RT9 (SP109).

Figure 27:
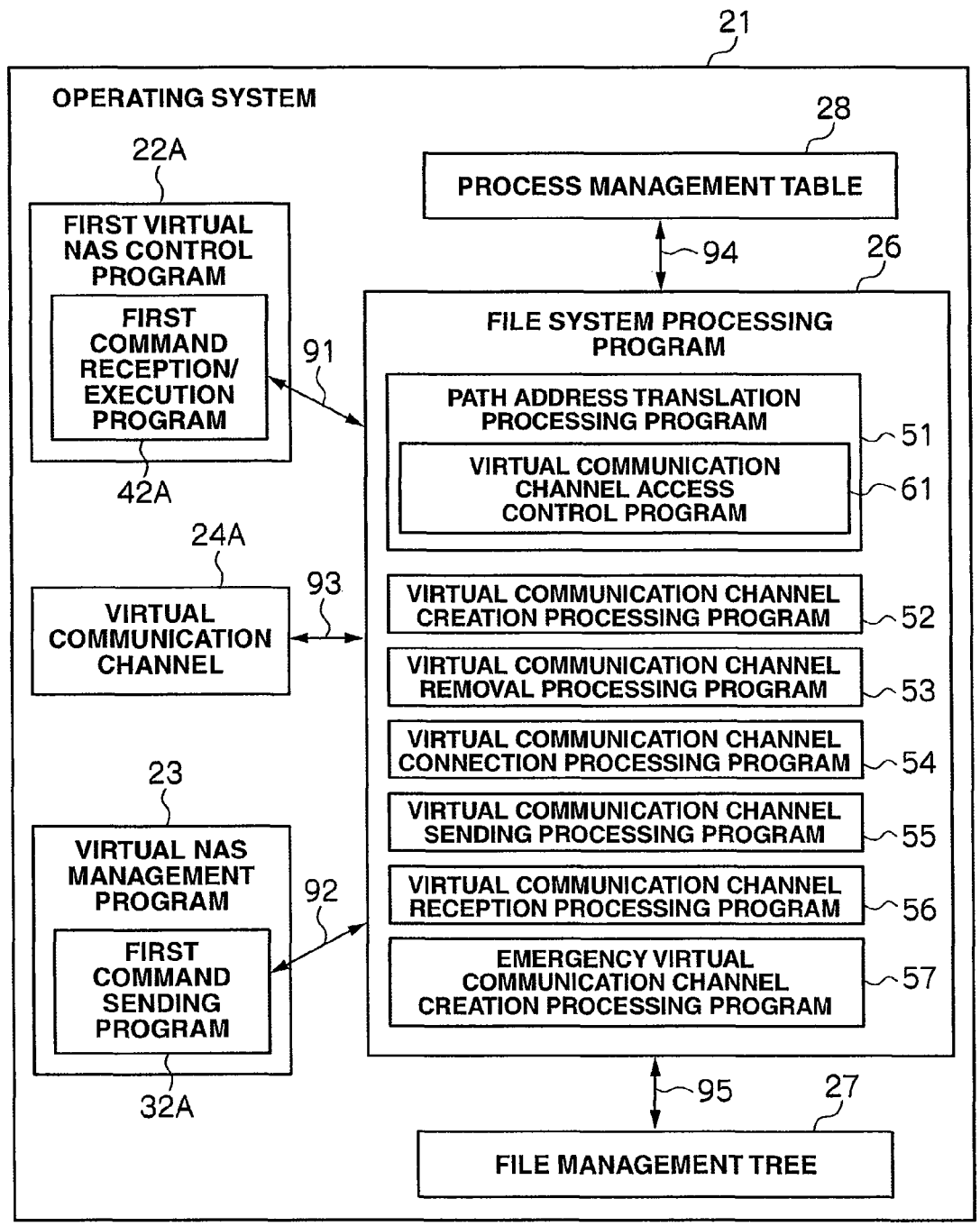
FIG. 27 is a conceptual diagram illustrating sending/reception of various commands between the programs in the operating system.

FIG. 27 shows an example of a flowchart of various command sending/reception between programs in the operating system 21.

As can be seen by the arrow 91 connecting the first command reception/execution program 42 and the file system processing program 26, the virtual communication channel creation request, the command reception completion notification, and the command execution feedback are sent from the first command reception/execution program 42A to the file system processing program 26.

Also, as can be seen by the arrow 91 connecting the first command reception/execution program 42A and the file system processing program 26, the virtual communication channel creation completion notification, the virtual communication channel connection completion notification, the emergency virtual communication channel connection completion notification, various commands, and the execution feedback reception completion notification are sent from the file system processing program 26 to the first command reception/execution program 42A.

As can be seen by the arrow 92 connecting the first command sending program 32A and the file system processing program 26, the virtual communication channel connection request, the emergency virtual communication channel creation request, the emergency virtual communication channel connection request, various commands, the execution feedback reception completion notification, and the virtual communication channel removal request are sent from the first command sending program 32A to the file system processing program 26.

Also, as can be seen by the arrow 92 connecting the first command sending program 32A and the file system processing program 26, the virtual communication channel connection completion notification, the emergency virtual communication channel creation completion notification, the emergency virtual communication channel connection completion notification, the command reception completion notification, and the command execution feedback are sent from the file system processing program 26 to the first command sending program 32A.

As can be seen by the arrow 93 connecting the file system processing program 26 and the first virtual communication channel 24A, the emergency virtual communication channel connection completion notification, various commands, the execution feedback reception completion notification, the emergency virtual communication channel connection completion notification, the command reception completion notification, and the command execution feedback are sent from the file system processing program 26 to the first virtual communication channel 24A.

Also, as can be seen by the arrow 93 connecting the file system processing program 26 and the first virtual communication channel 24A, the emergency virtual communication channel connection completion notification, various commands, the execution feedback reception completion notification, the emergency virtual communication channel connection completion notification, the command reception completion notification, and the command execution feedback are sent from the first virtual communication channel 24A to the file system processing program 26.

As can be seen by the arrow 94 connecting the file system processing program 26 and the process management table 28, the "sock" file address and the emergency communication file are sent from the file system processing program 26 to the process management table 28.

Also, as can be seen by the arrow 94 connecting the file system processing program 26 and the process management table 28, the column number of the file descriptor entry 28D, the "sock" file address, and the emergency "sock" file address are sent from the process management table 28 to the file system processing program 26.

As can be seen by the arrow 95 connecting the file system processing program 26 and the file management tree 27, the virtual communication channel path name is sent from the file system processing program 26 to the file management tree 27.

Also, as can be seen by the arrow 95 connecting the file system processing program 26 and the file management tree 27, the file/directory address corresponding to the virtual communication channel path name is sent from the file management tree 27 to the file system processing program 26.

As described above, in the storage system 1, the virtual NAS management program 23 is provided between the management computer 6, the first, second, and $n^{th}$ virtual NAS control programs 22A, 22B, and 22C. The first, second, and $n^{th}$ virtual NAS control programs 22A, 22B, and 22C share no physical cables and are connected to the virtual NAS management program 23 separately via the one-on-one first, second, and $n^{th}$ virtual communication channels 24A, 24B, and 24C, respectively.

The management computer 6 sends, to the virtual NAS management program 23, various commands for collectively managing the first, second, and $n^{th}$ virtual NAS control programs 22A, 22B, and 22C. The virtual NAS management program 23 collectively manages, according to various commands from the management computer 6, the first, second, and $n^{th}$ virtual NAS control programs 22A, 22B, and 23C by using the first, second, and $n^{th}$ virtual communication channels 24A, 24B, and 24C; the first, second, and $n^{th}$ command sending programs 32A, 32B, and 32C; and the first, second, and $n^{th}$ command reception/execution programs 42A, 42B, and 42C; each using the above virtual communication channels.

The first, second, and $n^{th}$ virtual communication channels 24A, 24B, and 24C are designed to be used for sending various command execution requests from the first, second, and $n^{th}$ command sending programs 32A, 32B, and 32C respectively to the first, second, and $n^{th}$ command reception/execution programs 42A, 42B, and 42C, and returning various command execution feedback.

Therefore, the first, second, and $n^{th}$ virtual NAS control programs 22A, 22B, and 22C cannot communicate freely with each other by using the first, second, and $n^{th}$ virtual communication channels 24A, 24B, and 24C.

In other words, nothing other than command execution feedback can be sent from the first, second, and $n^{th}$ virtual NAS control programs 22A, 22B, and 22C to the virtual NAS management program 23. Accordingly, even if any of the first, second, and $n^{th}$ virtual NAS control programs 22A, 22B, or 22C is taken over, communication cannot be made between the virtual NAS control program that has been taken over and the other virtual NAS control programs via the virtual NAS management program 23.

Also, since the first, second, and $n^{th}$ command sending programs 32A, 32B, and 32C, and the first, second, and $n^{th}$ command reception/execution programs 42A, 42B, and 42C are original applications, no malicious user can take over the virtual NAS management program 23 using general cracking tools and communicate with the first, second, and $n^{th}$ virtual NAS control programs 22A, 22B, and 22C via the virtual NAS management program 23.

Moreover, the first, second, and $n^{th}$ virtual NAS control programs 22A, 22B, and 22C do not share the same communication channel, so they cannot freely communicate with each other. Accordingly, even if any of the first, second, or $n^{th}$ virtual NAS control program 22A, 22B, or 22C becomes infected by a virus or is taken over by a malicious user, the virus or user cannot attack the other virtual NAS control programs.

As described above, in the host computer 4 in the storage system 1, none of the first, second, or $n^{th}$ virtual NAS control program 22A, 22B, or 22C can be used for spying on a file system used by another virtual NAS control program, or for accessing the first, second, or n client apparatus to which the relevant virtual NAS control program is currently providing services. Accordingly, a highly reliable storage apparatus 1 can be achieved.

The present invention can be widely used in not only host computers connected to client apparatuses and storage apparatuses and having independent NAS functions for sending/receiving data, but also any information processing apparatuses having independent control functions.

What is claimed is:

1. A storage system comprising:
   a NAS (Network Attached Storage) computer, the NAS computer comprising a memory, a processor, and a network controller coupled to a plurality of client apparatuses;
   a management computer coupled to the NAS computer;
   a path address translator translating a path name given for each of the first virtual connection and the second virtual connection into respective addresses; and
   a virtual communication channel connector,
   wherein the processor manages a plurality of virtual NAS processes, on the memory, the plurality of virtual NAS processes including a first virtual NAS process, a second virtual NAS process, and a virtual NAS management process,
   wherein the first virtual NAS process provides a first file service to a first client apparatus of the plurality of client apparatuses via a first network coupled to the network controller and the first client apparatus,
   wherein the second virtual NAS process provides a second file service to a second client apparatus of the plurality of client apparatuses via a second network coupled to the network controller and the second client apparatus,
   wherein the processor establishes a first virtual connection, on the memory, between the first virtual NAS process and the virtual NAS management process, and establishes a second virtual connection, on the memory, between the second virtual NAS process and the virtual NAS management process, the first virtual connection and the second virtual connection being separate connections,
   wherein the virtual NAS management process receives a command from the management computer, and sends the command to the first virtual NAS process via the first virtual connection, or to the second virtual NAS process via the second virtual connection,
   wherein the virtual communication channel connector establishes a connection between the first virtual NAS process and the virtual NAS management process via the first virtual connection when a name of a NAS process stored in an area at the address translated by the path address translator matches the name of the first virtual NAS process that is to be connected via the first virtual connection, and
   wherein the virtual communication channel connector establishes a connection between the second virtual NAS process and the virtual NAS management process via the second virtual connection when a name of a NAS process stored in an area at the address translated by the path address translator matches the name of the second virtual NAS process that is to be connected via the second virtual connection.

2. An information processing apparatus coupled to a management computer, the information processing apparatus comprising:
   a memory;
   a processor;
   a network controller coupled to a plurality of client apparatuses;
   a path address translator translating a path name given for each of the first virtual connection and the second virtual connection into respective addresses; and
   a virtual communication channel connector,
   wherein the processor manages a plurality of virtual NAS (Network Attached Storage) processes, on the memory, the plurality of virtual NAS processes including a first virtual NAS process, a second virtual NAS process, and a virtual NAS management process,
   wherein the first virtual NAS process provides a first file service to a first client apparatus of the plurality of client apparatuses via a first network coupled to the network controller and the first client apparatus,
   wherein the second virtual NAS process provides a second file service to a second client apparatus of the plurality of client apparatuses via a second network coupled to the network controller and the second client apparatus,
   wherein the processor establishes a first virtual connection, on the memory, between the first virtual NAS process and the virtual NAS management process, and establishes a second virtual connection, on the memory, between the second virtual NAS process and the virtual NAS management process, the first virtual connection and the second virtual connection being separate connections,
   wherein the virtual NAS management process receives a command from the management computer, and sends the command to the first virtual NAS process via the first virtual connection, or to the second virtual NAS process via the second virtual connection,
   wherein the virtual communication connector establishes a connection between the first virtual NAS process and the virtual NAS management process via the first virtual connection when a name of a NAS process stored in an area at the address translated by the path address translator matches the name of the first virtual NAS process that is to be connected via the first virtual connection, and
   wherein the virtual communication channel connector establishes a connection between the second virtual NAS process and the virtual NAS management process via the second virtual connection when a name of a NAS process stored in an area at the address translated by the path address translator matches the name of the second virtual NAS process that is to be connected via the second virtual connection.

3. A connection method for a NAS (Network Attached Storage) computer coupled to a management computer, wherein the NAS computer comprises a memory, a processor, and a network controller coupled to a plurality of client apparatuses, the connection method comprising:
   managing, by the processor, a plurality of virtual NAS processes, on the memory, the plurality of virtual NAS processes including a first virtual NAS process, a second virtual NAS process, and a virtual NAS management process;
   providing, by the first virtual NAS process, a first file service to a first client apparatus of the plurality of client apparatuses via a first network coupled to the network controller and the first client apparatus;
   providing, by the second virtual NAS process, a second file service to a second client apparatus of the plurality of client apparatuses via a second network coupled to the network controller and the second client apparatus;
   establishing, by the processor, a first virtual connection, on the memory, between the first virtual NAS process and the virtual NAS management process, and establishing a second virtual connection, on the memory, between the second virtual NAS process and the virtual NAS management process, the first virtual connection and the second virtual connection being separate connections; and receiving, by the virtual NAS management process, a command from the management computer, and sending the command to the first virtual NAS process via the first virtual connection, or to the second virtual NAS process via the second virtual connection;

translating a path name given for each of the first virtual connection and the second virtual connection into respective addresses;

establishing a connection between the first virtual NAS process and the virtual NAS management process via the first virtual connection when a name of a NAS process stored in an area at the translated address matches the name of the first virtual NAS process that is to be connected via the first virtual connection; and establishing a connection between the second virtual NAS process and the virtual NAS management process via the second virtual connection when a name of a NAS process stored in an area at the translated address matches the name of the second virtual NAS process that is to be connected via the second virtual connection.

4. The storage system according to claim 1, wherein the virtual communication channel connector establishes the first virtual connection connecting to the first virtual NAS process if a user has a user ID permitting access to the first virtual NAS process, and wherein the second virtual connection is established connecting to the second virtual NAS process if the user has a user ID permitting access to the second virtual NAS process.

5. The storage system according to claim 1, wherein each of the first virtual connection and the second virtual connection are created by allocating, to the respective first virtual connection or the second virtual connection, an area for storing a command sent from the management computer in the memory of the NAS computer.

6. The storage system according to claim 1, wherein at least one emergency virtual connection is established for sending an error message according to a request from the virtual NAS management process.

7. The storage system according to claim 6, wherein the virtual NAS management process sends an address of the at least one emergency virtual connection to a virtual communication channel connector via the first virtual connection or the second virtual connection, and the virtual communication channel connector separately connects the virtual NAS management process and each of the first virtual NAS process and the second virtual NAS process to the at least one emergency virtual connection based on the address of the at least one emergency virtual connection received via the first virtual connection or the second virtual connection.

8. The information processing apparatus according to claim 2, wherein the virtual communication channel connector establishes the first virtual connection connecting to the first virtual NAS process if a user has a user ID permitting access to the first virtual NAS process, and wherein the second virtual connection is established connecting to the second virtual NAS process if the user has a user ID permitting access to the second virtual NAS process.

9. The information processing apparatus according to claim 2, wherein each of the first virtual connection and the second virtual connection are created by allocating, to the respective first virtual connection or the second virtual connection, an area for storing a command sent from the external device in the memory of the NAS computer.

10. The information processing apparatus according to claim 2, wherein, according to a request from the virtual NAS management process, at least one of emergency virtual connection is established for sending an error message.

11. The information processing apparatus according to claim 10, wherein the virtual NAS management process sends an address of the at least one emergency virtual connection to a virtual communication channel connector via the first virtual connection or the second virtual connection, and the virtual communication channel connector separately connects the virtual NAS management process and each of the first virtual NAS process and the second virtual NAS process to the at least one emergency virtual connection based on the address of the received via the first virtual connection or the second virtual connection.

12. The connection method according to claim 3, further comprising:

establishing the first virtual connection connecting to the first virtual NAS process if a user has a user ID permitting access to the first virtual NAS process; and establishing the second virtual connection connecting to the second virtual NAS process if the user has a user ID permitting access to the second virtual NAS process.

13. The connection method according to claim 3, further comprising;

creating each of the first virtual connection and the second virtual connection in by allocating, to the respective first virtual connection or the second virtual connection, an area for storing a command sent from the management computer in the memory of the NAS computer.

14. The connection method according to claim 3, further comprising:

establishing at least one emergency virtual connection for sending an error message.

15. The connection method according to claim 14, further comprising:

sending an address of the at least one emergency virtual connection to a virtual communication channel connector via the first virtual connection or the second virtual connection after the at least one emergency virtual connection for sending the error message is established; and separately connecting the virtual NAS management process and each of the first virtual NAS process and the second virtual NAS process to the at least one emergency virtual connection based on the address of the at least one emergency virtual connection received via the first virtual connection or the second virtual connection.

* * * * *